(12) United States Patent
Wang et al.

(10) Patent No.: US 10,985,849 B2
(45) Date of Patent: Apr. 20, 2021

(54) INTERFERENCE COORDINATION METHOD, HIGH ALTITUDE PLATFORM STATION, AND BASE STATION

(71) Applicant: HUAWEI TECHNOLOGIES CO., LTD., Guangdong (CN)

(72) Inventors: Kaiyao Wang, Beijing (CN); Yongjun Liu, Beijing (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 100 days.

(21) Appl. No.: 16/457,575

(22) Filed: Jun. 28, 2019

(65) Prior Publication Data

US 2019/0327007 A1 Oct. 24, 2019

Related U.S. Application Data

(63) Continuation of application No. PCT/CN2017/114973, filed on Dec. 7, 2017.

(30) Foreign Application Priority Data

Dec. 29, 2016 (CN) .......................... 201611249142.7

(51) Int. Cl.
*H04B 17/345* (2015.01)
*H04W 72/04* (2009.01)
*H04B 7/185* (2006.01)
*H04L 5/00* (2006.01)

(52) U.S. Cl.
CPC ....... *H04B 17/345* (2015.01); *H04B 7/18504* (2013.01); *H04B 7/18506* (2013.01); *H04L 5/0007* (2013.01); *H04W 72/0453* (2013.01)

(58) Field of Classification Search
CPC ...... H04B 7/185–18523; H04B 17/345; H04L 5/0062; H04L 5/0073; H04L 25/03254;
(Continued)

(56) References Cited

U.S. PATENT DOCUMENTS 9,973,268 B1\* 5/2018 Husted .............. H04B 7/18534
2001/0039189 A1 11/2001 Cox
(Continued)

FOREIGN PATENT DOCUMENTS

CN 1440599 A 9/2003
CN 101420746 A 4/2009
(Continued)

OTHER PUBLICATIONS

Zhu Xiangming et al: "Position-assisted interference coordination for integrated terrestrial-satellite networks", 2015 IEEE 26th Annual Internationalsymposium on Personal, Indoor, ANO Mobile Radio Communications (PIMR0, IEEE, Aug. 30, 2015, pp. 971-975, XP032822107.

(Continued)

*Primary Examiner* — Michael Thier
*Assistant Examiner* — Prince A Mensah
(74) *Attorney, Agent, or Firm* — Womble Bond Dickinson (US) LLP

(57) ABSTRACT

Disclosed is an interference coordination method, a base station, and a high altitude platform station. The high altitude platform station receives information that includes a location of a base station and a radius of a central area of a coverage area of the base station, and calculates an interference start time and an interference end time according to the received information and a flight parameter of the high altitude platform station. The high altitude platform station sends interference coordination information to the base station, where the interference coordination information includes the interference start time, the interference end time, and a frequency band of a carrier used in both an edge area of a coverage area of the high altitude platform station and the central area of the coverage area of the base station.

(Continued)

The base station adjusts the coverage area of the carrier according to the interference coordination information.

26 Claims, 11 Drawing Sheets

(58) Field of Classification Search
 CPC ........... H04L 25/0328; H04L 25/03305; H04L 25/03821; H04L 27/2691; H04W 28/0236; H04W 36/20; H04W 40/16; H04W 52/24; H04W 52/0238–0241; H04W 72/0453; H04W 72/082
 See application file for complete search history.

(56) References Cited

U.S. PATENT DOCUMENTS

| | | | |
|---|---|---|---|
| 2004/0102191 A1 | 5/2004 | Pewitt et al. | |
| 2016/0105806 A1 | 4/2016 | Noerpel et al. | |
| 2017/0272131 A1* | 9/2017 | Ananth | H04W 72/082 |

FOREIGN PATENT DOCUMENTS

| | | |
|---|---|---|
| CN | 102281562 A | 12/2011 |
| CN | 103458428 A | 12/2013 |
| CN | 105356929 A | 2/2016 |
| CN | 105827301 A | 8/2016 |

OTHER PUBLICATIONS

Jeng-Ji Huang et al: "Interference Reduction for TerrestrialCellular COMA Systems via High Altitude Platform Station", IEEEVTSVehicular Technologyconference. Proceeoings, IEEE, US, Apr. 1, 2007, pp. 1350-1354, XP031092849.

Josä Luis Cuevas-Ruiz et al: ""Co-channel Interference for Terrestrial and HAPS Systems in a Cellular Structure"", Electronics, Robotics and Automotivemechanics Conference, 2009. CERMA "09, IEEE, Piscataway, NJ, USA, Sep. 22, 2009, pp. 50-54, XP031571828".

* cited by examiner

INTERFERENCE COORDINATION METHOD, HIGH ALTITUDE PLATFORM STATION, AND BASE STATION

CROSS-REFERENCE TO RELATED APPLICATIONS

This application is a continuation of International Application No. PCT/CN2017/114973, filed on Dec. 7, 2017, which claims priority to Chinese Patent Application No. 201611249142.7, filed on Dec. 29, 2016, The disclosures of the aforementioned applications are hereby incorporated by reference in their entireties.

TECHNICAL FIELD

This application relates to the field of communications, and in particular, to an interference coordination method, a high altitude platform station, and a base station.

BACKGROUND

A high altitude platform station (HAPS) is a communications device (for example, a base station) that is carried by a flight carrier (for example, a balloon, an airship, or a drone). Usually, a HAPS hovers in a stratosphere that is 17-22 km above the ground, so as to provide network coverage for an area on the ground. FIG. 1 is a schematic diagram of a location relationship of a HAPS relative to a ground base station (in FIG. 1, r represents a coverage radius of the ground base station and R represents a coverage radius of the HAPS).

It may be learned from FIG. 1 that a coverage area of the HAPS includes a coverage area of the ground base station. Therefore, the HAPS interferes with the ground base station. Currently, an inter-cell interference coordination (ICIC) technology is commonly used to reduce interference between adjacent cells. The ICIC technology means that orthogonal frequency resources, referred to as a primary carrier of a cell, are allocated to edge areas of adjacent cells, and a secondary carrier allocated to each cell is used in a central area of the cell (a primary carrier may also be used in the central area). For example, as shown in FIG. 2, a cell 1 uses F1 as a primary carrier, a cell 2 uses F2 as a primary carrier, a cell 3 uses F3 as a primary carrier, and F1, F2, and F3 are orthogonal to one another. The cell 1 uses F2 and F3 as secondary carriers, the cell 2 uses F1 and F3 as secondary carriers, and the cell 3 uses F1 and F2 as secondary carriers. In each cell, only secondary carriers are used in a central area, and a primary carrier is used in an edge area (a power threshold of the primary carrier is greater than those of the secondary carriers). Therefore, interference between adjacent cells can be reduced.

However, based on characteristics that the HAPS hovers at a high altitude and may cover a central area of an adjacent cell, interference caused by the HAPS to the ground base station or another HAPS cannot be avoided by using the ICIC technology shown in FIG. 1.

SUMMARY

This application provides an interference coordination method, a high altitude platform station, and a base station, to resolve a problem of interference of a HAPS to a ground base station or another HAPS.

According to a first aspect of this application, an interference coordination method is provided, including the following steps. A high altitude platform station receives information, where the information includes a location of a ground base station and a radius of a central area of a coverage area of the ground base station, and the central area of the coverage area of the ground base station is an area in which all carriers allocated to the ground base station can be used. The high altitude platform station calculates an interference start time and an interference end time according to the location, the radius, and a flight parameter of the high altitude platform station, where the interference start time is a time at which the high altitude platform station starts to interfere with the ground base station, the interference end time is a time at which the high altitude platform station stops interfering with the ground base station, and the high altitude platform station moves based on the flight parameter. The high altitude platform station sends interference coordination information to the ground base station, where the interference coordination information includes the interference start time, the interference end time, and a frequency band of a carrier, the carrier is used in both an edge area of a coverage area of the high altitude platform station and the central area of the coverage area of the ground base station, and the interference coordination information is used by the ground base station to adjust a coverage range of the carrier in the central area of the coverage area of the ground base station, so that the ground base station is not interfered with by the carrier of the high altitude platform station, where the edge area of the coverage area of the high altitude platform station is an area in which some carriers of all carriers allocated to the high altitude platform station can be used. The high altitude platform station sends the interference coordination information to the ground base station. Therefore, the ground base station can adjust the coverage range of the carrier in the central area of the coverage area of the ground base station in a time period in which the high altitude platform station generates interference, so as to avoid interference generated by the high altitude platform station.

According to a second aspect of this application, a high altitude platform station is provided, including a transceiver and a processor. The transceiver is configured to receive information, where the information includes a location of a ground base station and a radius of a central area of a coverage area of the ground base station, and the central area of the coverage area of the ground base station is an area in which all carriers allocated to the ground base station can be used. The processor is configured to calculate an interference start time and an interference end time according to the location, the radius, and a flight parameter of the high altitude platform station, where the interference start time is a time at which the high altitude platform station starts to interfere with the ground base station, the interference end time is a time at which the high altitude platform station stops interfering with the ground base station, and the high altitude platform station moves based on the flight parameter. The transceiver is further configured to send interference coordination information to the ground base station, where the interference coordination information includes the interference start time, the interference end time, and a frequency band of a carrier, the carrier is used in both an edge area of a coverage area of the high altitude platform station and the central area of the coverage area of the ground base station, and the interference coordination information is used by the ground base station to adjust a coverage range of the carrier in the central area of the coverage area of the ground base station, so that the ground base station is not interfered with by the carrier of the high altitude platform station, where the edge area of the coverage area of the high altitude platform station is an area in which some carriers of all carriers allocated to the high altitude platform station can be used. The high altitude platform station sends the interference coordination information to the ground base station, so as to avoid interference of the high altitude platform station to the ground base station.

In an implementation, the flight parameter of the high altitude platform station includes: a flight track of the high altitude platform station and a flight speed of the high altitude platform station; or a flight track of the high altitude platform station. In an implementation, before the high altitude platform station receives the information, the high altitude platform station sends an information obtaining request to the ground base station, where the information obtaining request is used to obtain the information.

In an implementation, the high altitude platform station calculates a shortest distance between the high altitude platform station and the ground base station according to the flight parameter and the location; and the interference coordination information further includes the shortest distance.

According to a third aspect of this application, an interference coordination method is provided, including the following steps. A ground base station receives interference coordination information generated by a high altitude platform station, where the interference coordination information includes a frequency band of a carrier, an interference start time, and an interference end time. The interference start time is a time at which the high altitude platform station starts to interfere with the ground base station, and the interference end time is a time at which the high altitude platform station stops interfering with the ground base station. The carrier is used in both an edge area of a coverage area of the high altitude platform station and a central area of a coverage area of the ground base station, the edge area of the coverage area of the high altitude platform station is an area in which some carriers of all carriers allocated to the high altitude platform station can be used, and the central area of the coverage area of the ground base station is an area in which all carriers allocated to the ground base station can be used. The ground base station adjusts a coverage range of the carrier in the central area of the coverage area of the ground base station according to the interference coordination information, so that the ground base station is not interfered with by the carrier of the high altitude platform station. The ground base station adjusts the coverage range of the carrier in the central area of the coverage area of the ground base station according to the interference coordination information. Therefore, interference of the high altitude platform station can be avoided.

According to a fourth aspect of this application, a base station is provided, including a transceiver and a processor. The transceiver is configured to receive interference coordination information generated by a high altitude platform station, where the interference coordination information includes a frequency band of a carrier, an interference start time, and an interference end time, the interference start time is a time at which the high altitude platform station starts to interfere with the base station, the interference end time is a time at which the high altitude platform station stops interfering with the base station, the carrier is used in both an edge area of a coverage area of the high altitude platform station and a central area of a coverage area of the base station, the edge area of the coverage area of the high altitude platform station is an area in which some carriers of all carriers allocated to the high altitude platform station can be used, and the central area of the coverage area of the base station is an area in which all carriers allocated to the base station can be used. The processor is configured to adjust a coverage range of the carrier in the central area of the coverage area of the base station according to the interference coordination information, so that the base station is not interfered with by the carrier of the high altitude platform station. The ground base station adjusts the coverage range of the carrier in the central area of the coverage area of the ground base station according to the interference coordination information. Therefore, interference of the high altitude platform station can be avoided.

In an implementation, the adjusting a coverage range of the carrier in the central area of the coverage area of the ground base station according to the interference coordination information includes: scheduling, in a time period from the interference start time to the interference end time, a user who uses the carrier in the central area of the coverage area of the ground base station to another carrier, and disabling the carrier, so that the coverage range of the carrier in the central area of the coverage area of the ground base station is zero, and the another carrier is orthogonal to the carrier.

In an implementation, after the interference end time, the ground base station reuses the carrier in the central area of the coverage area.

In an implementation, the interference coordination information further includes a shortest distance between the high altitude platform station and the ground base station; and the adjusting a coverage range of the carrier in the central area of the coverage area of the base station according to the interference coordination information includes: in a time period from the interference start time to the interference end time, shrinking the coverage range of the carrier in the central area of the coverage area of the ground base station into a target area, where a radius of the target area is less than a target radius, and the target radius is a difference between the shortest distance and a radius of the coverage area of the high altitude platform station.

In an implementation, after the interference end time, an original coverage range of the carrier is restored.

According to a fifth aspect of this application, an interference coordination method is provided, including the following steps. A first high altitude platform station obtains interference coordination information, where the interference coordination information includes a frequency band of a carrier and at least one of an interference start/end time or a shortest distance between the first high altitude platform station and a second high altitude platform station. The carrier is used in both an edge area of a coverage area of the second high altitude platform station and a central area of a coverage area of the first high altitude platform station. The start/end time includes an interference start time and an interference end time, the interference start time is a time at which the second high altitude platform station starts to interfere with the first high altitude platform station, and the interference end time is a time at which the second high altitude platform station stops interfering with the first high altitude platform station. The central area of the coverage area of the first high altitude platform station is an area in which all carriers allocated to the first high altitude platform station can be used, and the edge area of the coverage area of the second high altitude platform station is an area in which some carriers of all carriers allocated to the second high altitude platform station can be used. The first high altitude platform station adjusts a coverage range of the carrier in the central area of the coverage area of the first high altitude platform station according to the interference coordination information, so that the first high altitude platform station is not interfered with by the carrier of the second high altitude platform station. The first high altitude platform station can adjust the coverage range of the carrier in the central area of the coverage area of the first high altitude platform station according to the interference coordination information. Therefore, interference of the second high altitude platform station can be avoided.

According to a sixth aspect of this application, a high altitude platform station is provided, including a processor configured to obtain interference coordination information, where the interference coordination information includes a frequency band of a carrier and at least one of an interference start/end time or a shortest distance between the high altitude platform station and another high altitude platform station. The carrier is used in both a central area of a coverage area of the high altitude platform station and an edge area of a coverage area of the another high altitude platform station. The start/end time includes an interference start time and an interference end time, the interference start time is a time at which the another high altitude platform station starts to interfere with the high altitude platform station, and the interference end time is a time at which the another high altitude platform station stops interfering with the high altitude platform station. The processor is further configured to adjust a coverage range of the carrier in the central area of the coverage area of the high altitude platform station according to the interference coordination information, so that the central area of the coverage area of the high altitude platform station is not interfered with by the carrier of the another high altitude platform station, where the central area of the coverage area of the high altitude platform station is an area in which all carriers allocated to the high altitude platform station can be used, and the edge area of the coverage area of the another high altitude platform station is an area in which some carriers of all carriers allocated to the another high altitude platform station can be used.

In an implementation, the interference coordination information includes the frequency band of the carrier, the interference start time, and the interference end time. That the first high altitude platform station adjusts a coverage range of the carrier in the central area of the coverage area of the first high altitude platform station according to the interference coordination information includes: in a time period from the interference start time to the interference end time, the first high altitude platform station schedules a user who uses the carrier in the central area of the coverage area of the first high altitude platform station to another carrier, and disables the carrier, so that the coverage range of the carrier in the central area of the coverage area of the first high altitude platform station is zero, and the another carrier is orthogonal to the carrier.

In an implementation, after the interference end time, the first high altitude platform station reuses the carrier in the central area of the coverage area of the first high altitude platform station.

In an implementation, the interference coordination information includes the frequency band of the carrier, the interference start time, the interference end time, and the shortest distance between the first high altitude platform station and the second high altitude platform station. That the first high altitude platform station adjusts a coverage range of the carrier in the central area of the coverage area of the first high altitude platform station according to the interference coordination information includes: in a time period from the interference start time to the interference end time, the first high altitude platform station schedules some users who use the carrier in the central area of the coverage area of the first high altitude platform station to another carrier, and shrinks the coverage range of the carrier in the central area of the coverage area of the first high altitude platform station into a target area, where a radius of the target area is less than or equal to a target radius, the target radius is a difference between the shortest distance and a coverage radius of the second high altitude platform station, the some users are users who are covered before the carrier is shrunk but are not covered after the carrier is shrunk, and the another carrier is orthogonal to the carrier.

In an implementation, the interference coordination information includes the frequency band of the carrier and the shortest distance between the first high altitude platform station and the second high altitude platform station. That the first high altitude platform station adjusts a coverage range of the carrier in the central area of the coverage area of the first high altitude platform station according to the interference coordination information includes: the first high altitude platform station schedules some users who use the carrier in the central area of the coverage area of the first high altitude platform station to another carrier, and shrinks the coverage range of the carrier in the central area of the coverage area of the first high altitude platform station into a target area, where a radius of the target area is less than or equal to a target radius, the target radius is a difference between the shortest distance and a coverage radius of the second high altitude platform station, the some users are users who are covered before the carrier is shrunk but are not covered after the carrier is shrunk, and the another carrier is orthogonal to the carrier. The interference start time and the interference end time are not considered. Therefore, frequent carrier adjustment can be avoided.

In an implementation, that a first high altitude platform station obtains interference coordination information includes: the first high altitude platform station sends an information obtaining request to the second high altitude platform station. The first high altitude platform station receives information that is sent by the second high altitude platform station according to the information obtaining request, where the information includes the frequency band of the carrier, a flight parameter of the second high altitude platform station, and the radius of the coverage area of the second high altitude platform station, and the second high altitude platform station moves based on the flight parameter of the second high altitude platform station. The first high altitude platform station calculates the interference coordination information according to a flight parameter of the first high altitude platform station, the flight parameter of the second high altitude platform station, and the radius of the coverage area of the second high altitude platform station, where the first high altitude platform station moves based on the flight parameter of the first high altitude platform station.

In an implementation, that a first high altitude platform station obtains interference coordination information includes: the first high altitude platform station receives the interference coordination information.

In an implementation, before the first high altitude platform station obtains the interference coordination information, the first high altitude platform station sends a request message for reducing the coverage range of the carrier to the second high altitude platform station. The frequency band of the carrier includes: a partial frequency band $\Delta f$ in the carrier and another frequency band different from $\Delta f$ in the carrier, where $\Delta f$ is a frequency band whose coverage range the second high altitude platform station agrees to reduce in the carrier, and the another frequency band different from $\Delta f$ is a frequency band whose original coverage range in the carrier retains unchanged. The information further includes: a coverage radius of Δf and a coverage radius of the another frequency band different from Δf in the carrier. The first high altitude platform station may negotiate with the second high altitude platform station to reduce the coverage range of the carrier. Therefore, load balancing among carriers can be adjusted.

In an implementation, after the first high altitude platform station adjusts the coverage range of the carrier in the central area of the coverage area of the first high altitude platform station according to the interference coordination information, the first high altitude platform station sends a request message for reducing the coverage range of the carrier to the second high altitude platform station. The first high altitude platform station receives a partial frequency band Δf in the carrier and a coverage radius of Δf that are sent by the second high altitude platform station according to the request message. The first high altitude platform station readjusts a coverage range of Δf in the central area of the coverage area of the first high altitude platform station according to Δf and the coverage radius of Δf.

In an implementation, the flight parameter includes: a flight track and a flight speed. Alternatively, the flight parameter includes: a flight track.

According to a seventh aspect of this application, an interference coordination method is provided, including the following steps. A high altitude platform station receives location information of a ground base station. The high altitude platform station calculates a shortest distance between the high altitude platform station in a flight process and the ground base station according to the location information of the ground base station and a flight parameter of the high altitude platform station. The high altitude platform station sends interference coordination information to the ground base station, where the interference coordination information includes the shortest distance and a frequency band of a carrier, and the carrier is used in both an edge area of a coverage area of the high altitude platform station and a central area of a coverage area of the ground base station.

According to an eighth aspect of this application, an interference coordination method is provided, including the following steps. A ground base station receives interference coordination information, where the interference coordination information includes a frequency band of a carrier and a shortest distance between a high altitude platform station and the ground base station, and the carrier is used in both an edge area of a coverage area of the high altitude platform station and a central area of a coverage area of the ground base station. The ground base station shrinks a coverage range of the carrier in the central area of the coverage area of the ground base station into a target area, where a radius of the target area is less than a target radius, and the target radius is a difference between the shortest distance and a radius of the coverage area of the high altitude platform station. It may be learned that the ground base station shrinks the coverage range of the carrier according to the interference coordination information. Therefore, interference of the high altitude platform station can be avoided.

BRIEF DESCRIPTION OF DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

Figure 1:
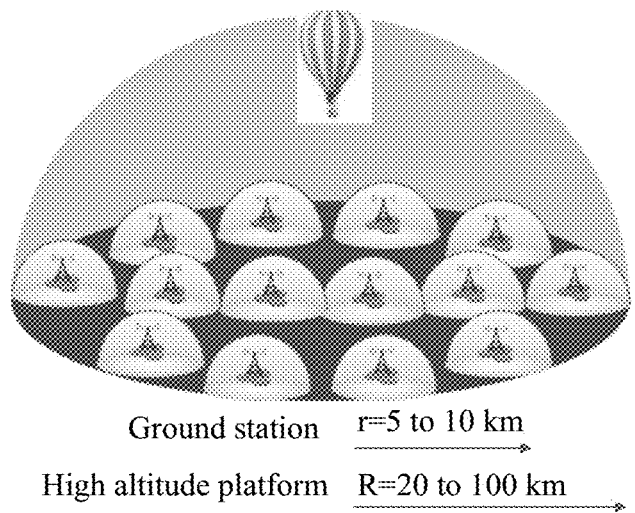
FIG. 1 is a schematic diagram of a location relationship of a HAPS relative to a ground base station.
Figure 2:
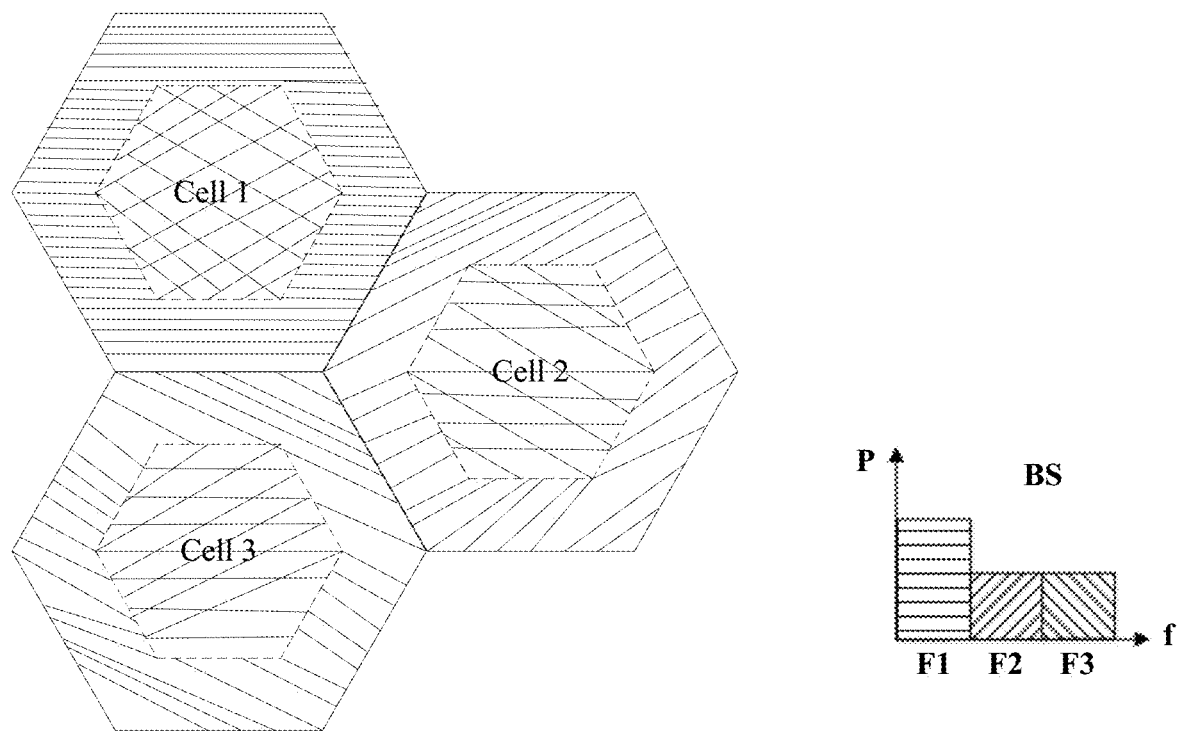
FIG. 2 is a schematic diagram of carriers of cells.
Figure 3:
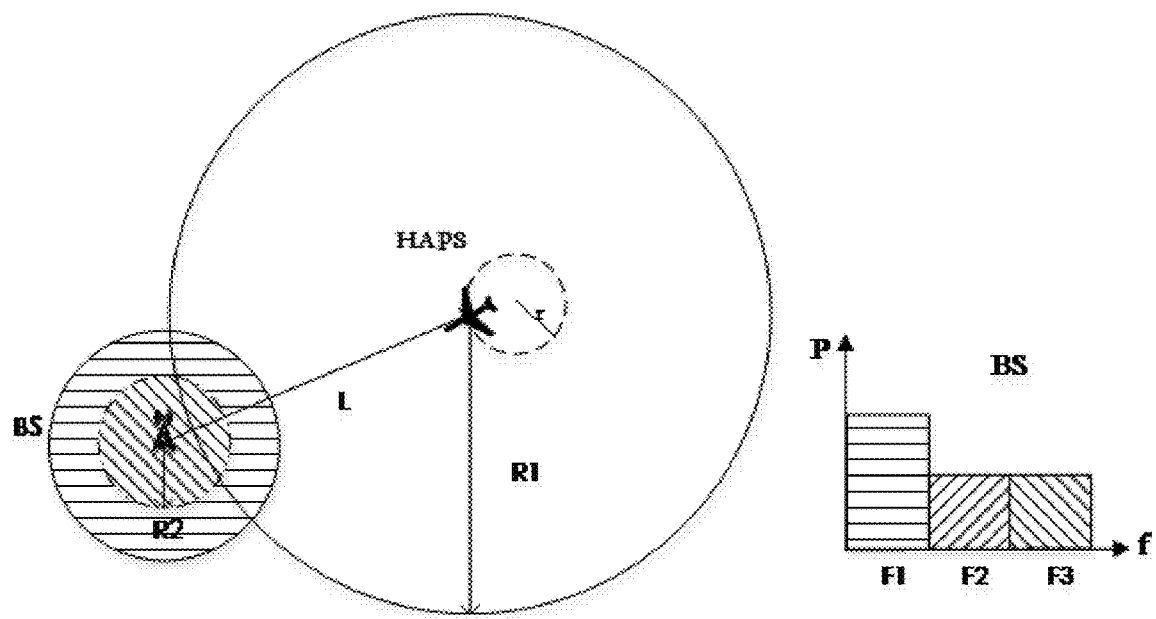
FIG. 3 is an example diagram of interference caused by a coverage area of the HAPS shown in FIG. 1 to a coverage area of a ground base station.

FIG. 3 shows an example in which interference is caused by a coverage area of a HAPS shown in FIG. 1 to a coverage area of a ground base station (BS), where a flight radius of the HAPS is r, and a radius of the coverage area of the HAPS is R1. A primary carrier F2 (not shown in FIG. 3) is used in an edge area of the coverage area of the HAPS. A primary carrier F1 is used in an edge area of the coverage area of the ground BS, a radius of a central area is R2, and a secondary carrier F2 (not shown in FIG. 3) and a secondary carrier F3 are used in the central area. F1 is orthogonal to F2.

In this embodiment of this application, the edge area of the coverage area of the HAPS or the ground BS is an area with a frequency reuse factor greater than 1 in the coverage area, that is, in this area, some carriers/subcarriers of all carriers/subcarriers allocated to the HAPS or the ground BS can be used. The central area of the coverage area is an area with a frequency reuse factor equal to 1 in the coverage area, that is, in this area, all carriers/subcarriers allocated to the HAPS or the ground BS can be used.

A carrier means a frequency resource allocated to the HAPS or the ground BS, and each carrier has a respective frequency band and coverage range.

When the HAPS approaches the ground BS along a flight track, for example, when the HAPS shown in FIG. 3 is at a location closest to the ground BS on the flight track, the coverage area of the HAPS overlaps with the central area of the coverage area of the ground BS. As shown in FIG. 3, the area with the radius of R1 partially overlaps with the area with the radius of R2. In this case, the subcarrier F2 is used in both the overlapped areas. Therefore, mutual inter-cell interference is caused.

Figure 4:
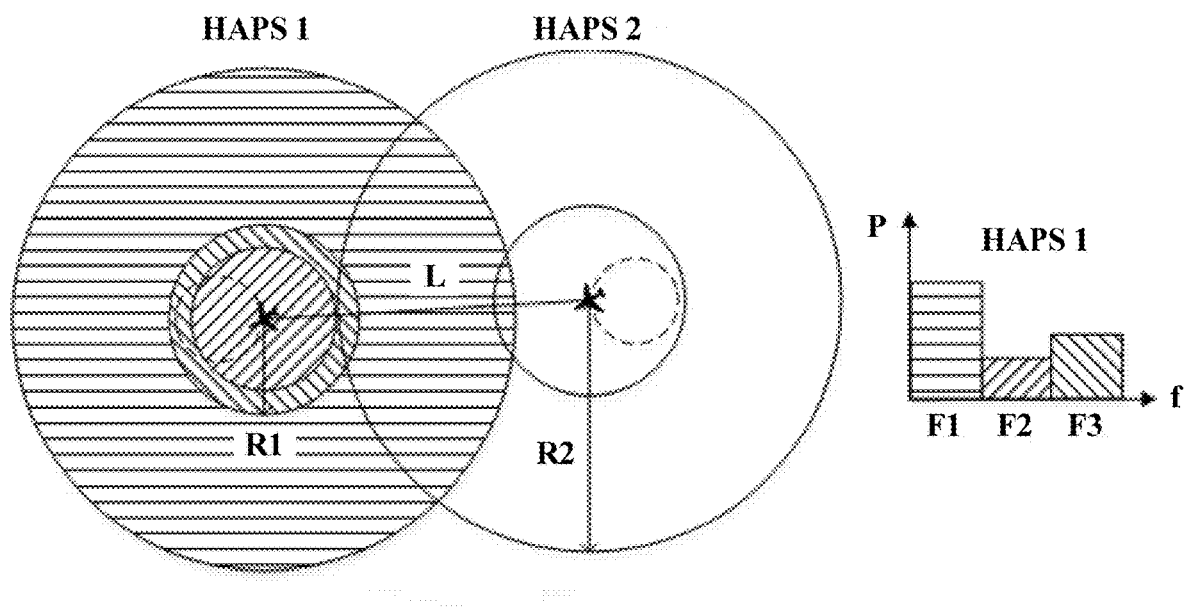
FIG. 4 is an example diagram of interference caused by a coverage area of the HAPS shown in FIG. 1 to a coverage area of another HAP S.

FIG. 4 shows an example in which interference is caused by a coverage area of the HAPS shown in FIG. 1 to a coverage area of another HAPS. A cell belonging to a HAPS 1 is adjacent to a cell belonging to a HAPS 2, a primary carrier F1 is used in an edge area of a coverage area of the HAPS 1, and secondary carriers F2 and F3 are used in a central area. A primary carrier F2 (not shown in FIG. 4) is used in an edge area of a coverage area of the HAPS 2, and a secondary carrier F1 (not shown in FIG. 4) and a secondary carrier F3 (not shown in FIG. 4) are used in a central area. When the HAPS 1 approaches the HAPS 2, for example, in FIG. 4, when a distance between the HAPS 1 and the HAPS 2 is the shortest, the edge area of the coverage area of the HAPS 1 partially overlaps with the central area of the coverage area of the HAPS 2, and the edge area of the coverage area of the HAPS 2 partially overlaps with the central area of the coverage area of the HAPS 1. Therefore, mutual inter-cell interference is caused.

The interference coordination method disclosed in this embodiment of this application is intended to reduce inter-cell interference caused by the HAPS shown in FIG. 3 or FIG. 4.

It should be noted that FIG. 3 and FIG. 4 are merely examples of scenarios of inter-cell interference caused by the HAP S, but are not the only scenarios. The HAPS may alternatively interfere with a plurality of ground base stations, or interfere with a plurality of other HAPSs, or interfere with both a ground base station and another HAPS. Scenarios are not enumerated herein. For a case in which a plurality of objects are interfered with, refer to the scenario shown in FIG. 3 or FIG. 4.

The following describes the technical solutions in the embodiments of this application with reference to the accompanying drawings in the embodiments of this application.

Figure 5:
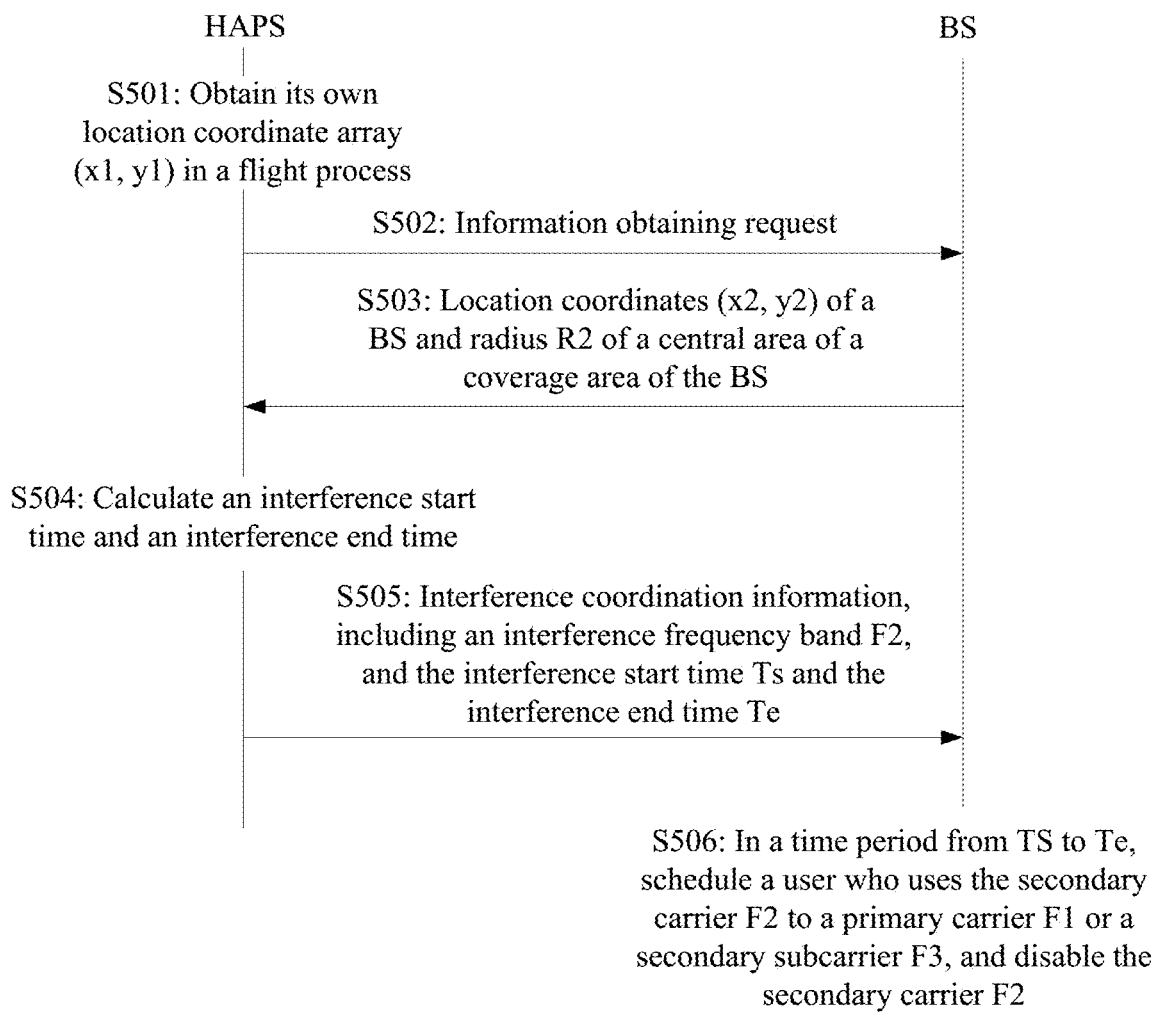
FIG. 5 is a flowchart of an interference coordination method disclosed in an embodiment of this application.

FIG. 5 shows an interference coordination method disclosed in an embodiment of this application. Using FIG. 3 as an example, the method includes the following operations.

S501: A HAPS obtains its own location in a flight process.

In this embodiment, a location coordinate array (x1, y1) is used as an example of a location (x1 represents a vector, and a value in the vector is at least one x coordinate in the flight process; and y1 represents a vector, and a value in the vector is a y coordinate corresponding to the x coordinate in the flight process). Specifically, the HAPS may carry a locating device, and the HAPS obtains its own location by using the locating device. Preferably, x1 includes an x coordinate in at least one flight cycle, and y1 includes a y coordinate corresponding to the x coordinate in the at least one flight cycle.

S502: The HAPS sends an information obtaining request to a ground BS.

Specifically, the HAPS may communicate with the ground BS over an X2 interface.

Optionally, S502 may alternatively be performed before S501.

S503: After receiving the information obtaining request, the ground BS sends information to the HAPS, where the information includes a location of the ground BS and a radius R2 indicating a central area of a coverage area of the ground BS.

In this embodiment, location coordinates $(x_2, y_2)$ of the BS are used as an example of the location of the ground BS.

S504: The HAPS calculates a moment at which $\Delta$=L−(R1+R2)=0, where L is a distance between the HAPS and the BS, and R1 is a radius of a coverage area of the HAPS.

If $\Delta$ is greater than 0, it indicates that an edge area of the coverage area of the HAPS does not yet cover the central area of the coverage area of the BS. If $\Delta$ is equal to 0, it indicates that an edge area of the coverage area of the HAPS starts to overlap with the central area of the coverage area of the BS, or ends overlapping with the central area of the coverage area of the BS. If $\Delta$ is less than 0, it indicates that an edge area of the coverage area of the HAPS overlaps with the central area of the coverage area of the BS. Therefore, in a process in which the HAPS approaches the BS, an earlier time and a later time that are obtained by using $\Delta$=L−(R1+R2)=0 are an interference start time and an interference end time, respectively.

Specifically, a process of calculating a moment at which $\Delta$=L−(R1+R2)=0 includes the following.

Figure 6:
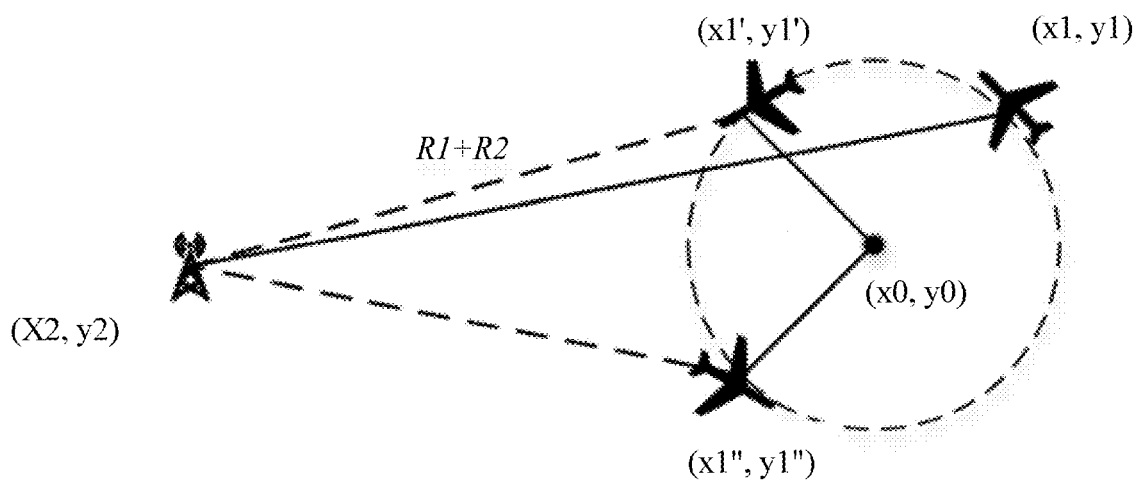
FIG. 6 is a schematic location diagram of a HAPS and a ground BS when the HAPS flies counterclockwise.

As shown in FIG. 6, it is assumed that the HAPS flies counterclockwise. The HAPS calculates locations (x1', y1') and (x1", y1") of the HAPS according to the location information $(x_2, y_2)$ of the ground BS, a central point location $(x_0, y_0)$ of a flight track, a radius r of the flight track, and formula (1) when a distance value L between the HAPS and the ground BS is equal to R1+R2. The location (x1', y1') is an interference start location, and the location (x1", y1") is an interference end location.

The central point location $(x_0, y_0)$ and the radius r of the flight track may be obtained according to a location coordinate array (x1, y1) of the HAPS. Refer to formula (2) and formula (3), respectively. Optionally, the central point location $(x_0, y_0)$ and the radius r of the flight track may be calculated in S504 or may be calculated in S501.

$$\begin{cases} (x_2 - x1_i)^2 + (y_2 - y1_i)^2 = (R1 + R2)^2 \\ (x1_i - x_0)^2 + (y1_i - y_0)^2 = r^2 \end{cases} \quad (1)$$

$$\begin{cases} x_0 = \frac{1}{N} \cdot \sum_{i=1}^{N} x_i \\ y_0 = \frac{1}{N} \cdot \sum_{i=1}^{N} y_i \end{cases} \quad (2)$$

$$r = \frac{1}{N} \cdot \sum_{i=1}^{N} \sqrt[2]{(x_i - x_0)^2 + (y_i - y_0)^2} \quad (3)$$

$(x_i, y_i)$ represents $i^{th}$ location coordinates of the HAPS.

After the interference start location and the interference end location are obtained, an interference start time and an interference end time may be obtained according to the following two manners:

1. In a flight cycle, when the HAPS flies to the location (x1', y1'), a time Ts (that is, the interference start time) is recorded, and when the HAPS flies to the location (x1", y1"), a time Te (that is, the interference end time) is recorded.

2. At a moment t1, the HAPS calculates a flight distance (a distance along the flight track instead of a linear distance) $L_{o1}$ from a current location (x1, y1) to the location (x1', y1') according to the flight track of the HAPS, and calculates the interference start time $Ts=t1+L_{o1}/V$ according to a flight speed V of the HAPS. Likewise, the HAPS calculates a flight distance $L_{o2}$ (a distance along the flight track instead of a linear distance) from the current location (x1, y1) to the location (x1", y1"), and calculates the interference end time $Te=t1+L_{o2}/V$ according to the flight speed V of the HAPS.

It may be learned that in manner 1, the interference start time and the interference end time are recorded in real time, and in manner 2, the interference start time and the interference end time are calculated according to the flight track and the flight speed.

S505: The HAPS sends interference coordination information to the ground BS, where the interference coordination information includes a frequency band of a primary carrier of the HAPS, that is an interference frequency band F2, and an interference start time and an interference end time. Further, the interference coordination information may further include a flight cycle of the HAPS.

S506: In a time period from the interference start time to the interference end time, the ground BS schedules a user who uses the secondary carrier F2 to a primary carrier F1 or a secondary carrier F3, and disables the secondary carrier F2, so that a coverage range of the disabled F2 is zero.

It should be noted that the scheduling a user on a carrier to another carrier is specifically as follows: At least one user may be scheduled to one of other carriers, or at least one user may be scheduled to a plurality of carriers in other carriers. For a specific method, refer to an existing scheduling algorithm commonly used in LTE. Details are not described herein.

Further, when the flight cycle and track of the HAPS are fixed, the ground BS may periodically perform S506 according to the received flight cycle of the HAPS, and do not need to frequently interact with the HAPS. If the HAPS changes the flight cycle or track (for example, when weather changes), the process shown in FIG. 5 may be performed again.

Figure 7A:
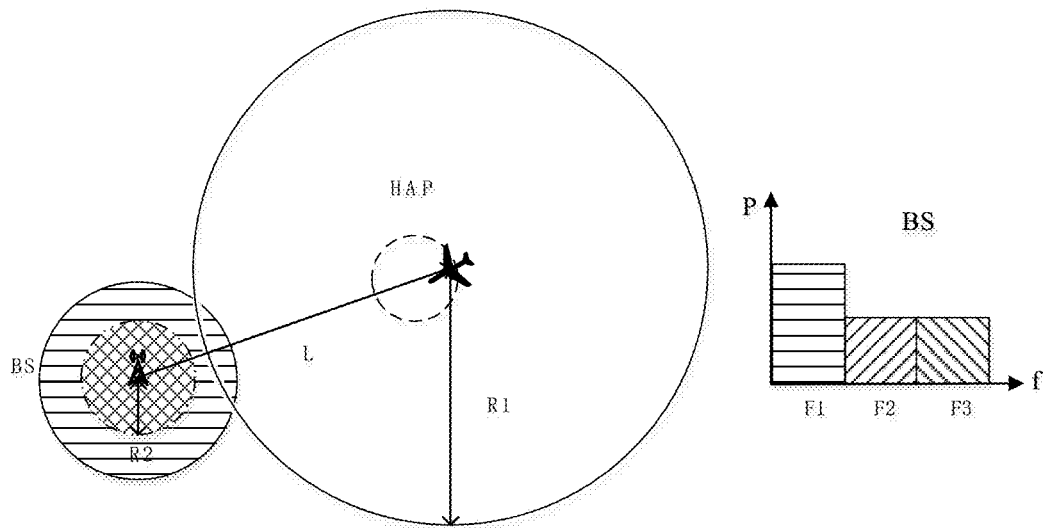
FIG. 7a is a schematic diagram of a carrier when a HAPS does not interfere with a ground BS.
Figure 7B:
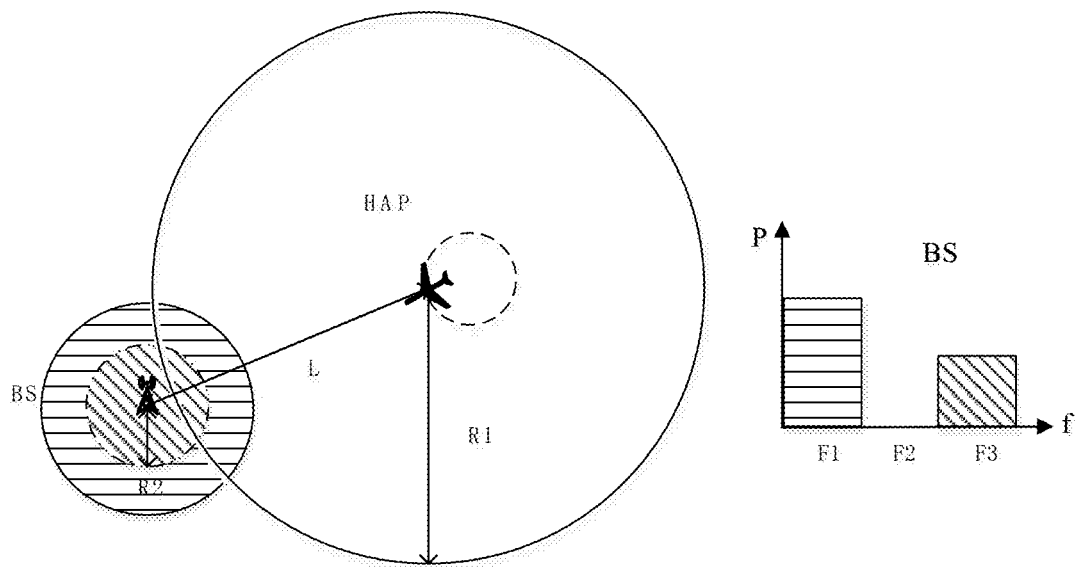
FIG. 7b is a schematic diagram of a carrier after the procedure shown in FIG. 5 is performed when a HAPS interferes with a ground BS.

FIG. 7a shows a case in which a HAPS does not interfere with a ground BS. In this case, the ground BS uses F1 as a primary carrier and uses F2 and F3 as secondary carriers. FIG. 7b shows a case in which a HAPS interferes with a ground BS. After the procedure shown in FIG. 5 is performed, different from that in FIG. 3, the ground BS uses F1 as a primary carrier, uses F3 as a secondary carrier, and disables a carrier F2. As shown in FIG. 7b, power of F2 is zero.

It may be learned that in the procedure shown in FIG. 5, based on a location relationship of the HAPS in a flight process relative to the ground BS, the ground BS may temporarily disable an interfered-with carrier to improve communication quality.

Figure 8:
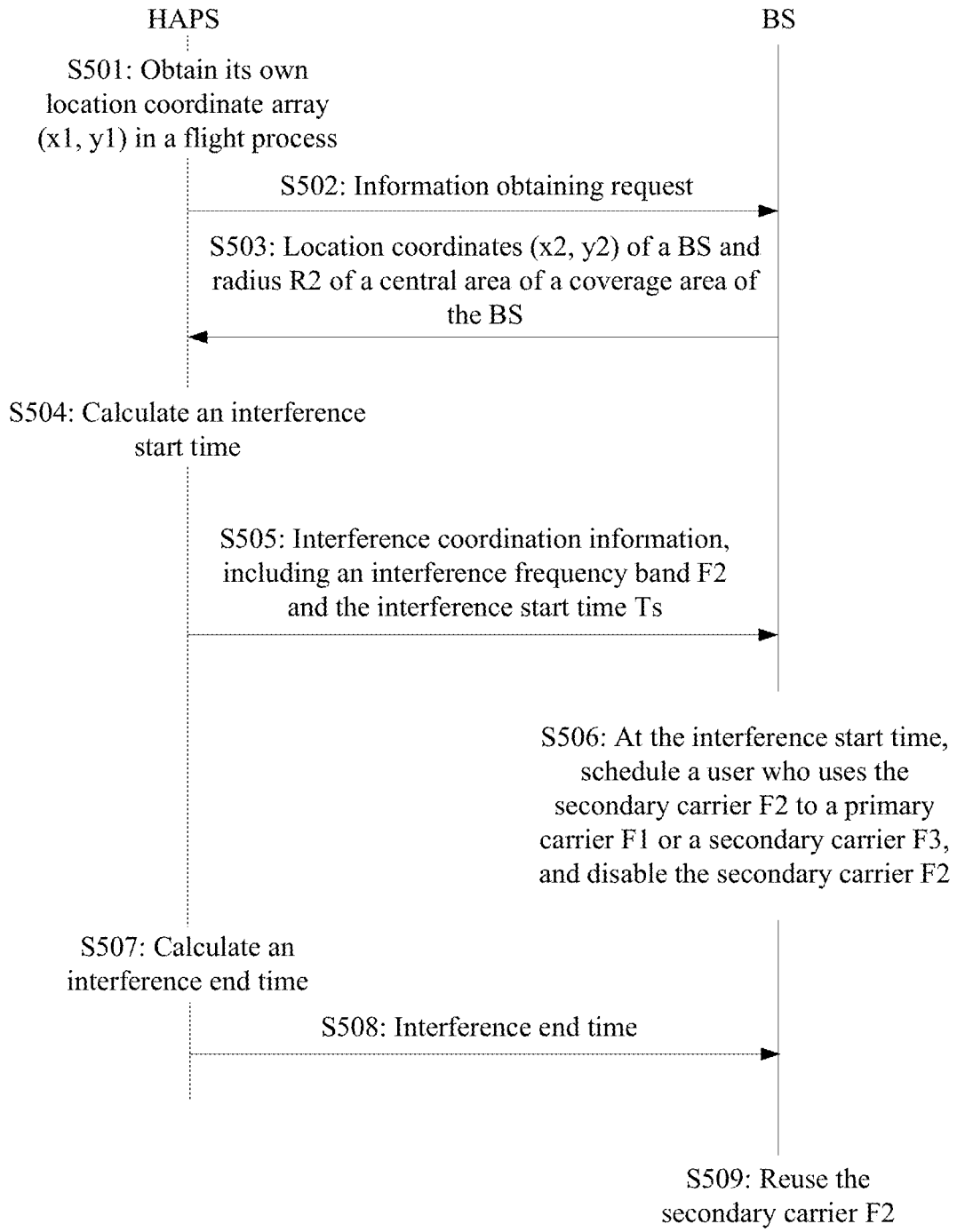
FIG. 8 is a flowchart of another interference coordination method disclosed in an embodiment of this application.

Optionally, as shown in FIG. 8, an interference start time may be first calculated in S504 and sent to the BS, and then an interference end time may be calculated and sent to the BS. At the interference start time, the BS schedules a user who uses a secondary carrier F2 to a primary carrier F1 or a secondary carrier F3, and no longer uses the secondary carrier F2. At the interference end time, the BS then reuses the secondary carrier F2.

Figure 9:
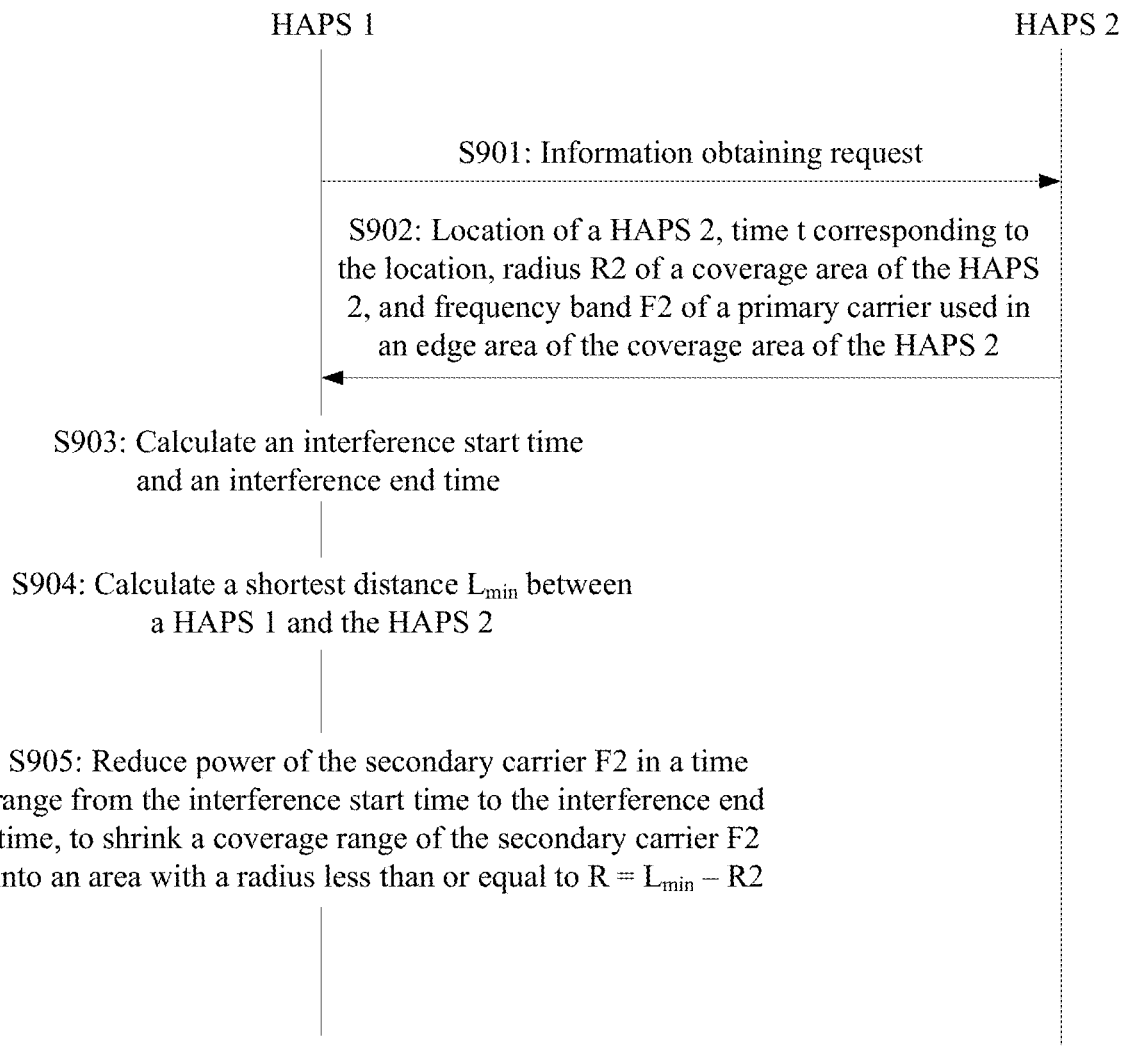
FIG. 9 is a flowchart of still another interference coordination method disclosed in an embodiment of this application.

FIG. 9 shows still another interference coordination method disclosed in an embodiment of this application. Using FIG. 4 as an example, the method includes the following operations.

S901: A HAPS 1 sends an information obtaining request to a HAPS 2.

S902: After receiving the information obtaining request, the HAPS 2 sends, to the HAPS 1, a flight parameter of the HAPS 2, a radius R2 of a coverage area of the HAPS 2, and a frequency band F2 of a primary carrier used in an edge area of the coverage area of the HAPS 2.

The HAPSs move in the air based on their respective flight parameters. In this embodiment, the flight parameter of the HAPS 2 includes but is not limited to a flight track and a flight speed of the HAPS 2. The flight track may include location information in a flight process and a time t corresponding to the location information.

Optionally, the HAPS 1 may calculate location information of the HAPS 2 according to the flight track and the flight speed, and the HAPS 1 may alternatively receive the location information of the HAPS 2. A location coordinate array (x2, y2) is used as an example of the location information (x2 represents a vector, and a value in the vector is at least one x coordinate in the flight process; and y2 represents a vector, and a value in the vector is a y coordinate corresponding to the x coordinate in the flight process).

The time t corresponding to the location information is a vector $[t_1, t_2, t_3, \ldots]$, and a value in the vector is a time at which the HAPS 2 arrives at a corresponding coordinate value $(x2_i, y2_i)$ in the location coordinate array.

Specifically, the HAPS 1 may communicate with the HAPS 2 over an X2 interface.

S903: The HAPS 1 calculates moments at which $\Delta=L-(R1+R2)=0$, that is, an interference start time and an interference end time, where L is a distance between the HAPS 1 and the HAPS 2.

Specifically, a process of calculating the moments at which $\Delta=L-(R1+R2)=0$ is as follows:

1. According to a location coordinate array (x1, y1) of the HAPS 1 and the location coordinate array (x2, y2) of the HAPS 2, calculate a distance array L between the HAPS 1 and the HAPS 2 at a time array t:

$$L_i = \sqrt[2]{(x1_i - x2_i)^2 + (y1_i - y2_i)^2} \qquad (4)$$

$(x1_i, y1_i)$ represents $i^{th}$ location coordinates of the HAPS 1, and $(x2_i, y2_i)$ represents $i^{th}$ location coordinates of the HAPS 2.

It should be noted that $(x1_i, y1_i)$ and $(x2_i, y2_i)$ are location coordinates at a same time $t_i$. To achieve this effect, the HAPS 1 needs to negotiate with the HAPS 2 in advance to obtain a time: For example, both the HAPS 1 and the HAPS 2 need to start with an initial time $t_0$ and obtain their own location coordinates once at an interval of a time $\Delta t$. Alternatively, each time after receiving location coordinates of the HAPS 2, the HAPS 1 immediately obtains its own location coordinates once. Alternatively, after receiving a time array t of a flight cycle of the HAPS 2, the HAPS 1 calculates a time array t'=mod(t, T) (modulo operation) according to the flight cycle T of the HAPS 2, and obtains its own location coordinate array when t'=t.

2. Calculate locations (x1', y1') and (x1", y1") of the HAPS 1 when a distance value L between the HAPS 1 and the HAPS 2 is equal to R1+R2. The location (x1', y1') is an interference start location, and the location (x1", y1") is an interference end location.

After the interference start location and the interference end location are obtained, an interference start time and an interference end time may be obtained according to the following two manners:

(1) In a flight cycle, when the HAPS 1 flies to the location (x1', y1'), a time Ts (that is, the interference start time) is recorded, and when the HAPS 1 flies to the location (x1", y1"), a time Te (that is, the interference end time) is recorded.

(2) At a moment t1, the HAPS 1 calculates a flight distance (a distance along the flight track instead of a linear distance) $L_{o1}$ from a current location (x1, y1) to the location (x1', y1') according to the flight track of the HAPS 1, and calculates the interference start time Ts=t1+$L_{o1}$/V according to a flight speed V of the HAPS 1. Likewise, the HAPS 1 calculates a flight distance $L_{o2}$ (a distance along the flight track instead of a linear distance) from the current location (x1, y1) to the location (x1", y1"), and calculates the interference end time Te=t1+$L_{o2}$/V according to the flight speed V of the HAPS 1.

It may be learned that in manner (1), the interference start time and the interference end time are recorded in real time, and in manner (2), the interference start time and the interference end time are calculated according to the flight track and the flight speed.

S904: The HAPS 1 calculates a shortest distance $L_{min}$ between the HAPS 1 and the HAPS 2.

Specifically, the HAPS 1 selects a smallest value from the distance array L as the shortest distance between the HAPS 1 and the HAPS 2:

$L_{min}$=min(L)

S905: The HAPS 1 reduces power of the secondary carrier F2 in a time range from the interference start time to the interference end time, to shrink a coverage range of the secondary carrier F2 in a central area of a coverage area of the HAPS 1 into an area with a radius less than or equal to R=$L_{min}$-R2.

It should be noted that the HAPS 2 may alternatively send an information obtaining request to the HAPS 1. The HAPS 2 calculates the interference start time and the interference end time. The HAPS 2 sends interference coordination information to the HAPS 1, where the interference coordination information includes the interference start time, the interference end time, and carrier information. The HAPS 1 receives the interference coordination information and performs carrier adjustment.

According to the process shown in FIG. 9, in a manner of shrinking a coverage range of a secondary carrier of one HAPS, interference of another HAPS is avoided.

The manner, shown in FIG. 9, of shrinking a coverage area of an interfered-with secondary carrier may alternatively be applied to a ground BS. That is, in addition to using the manner that the interfered-with secondary carrier is not used in a time period from the interference start time to the interference end time, shown in FIG. 5 or FIG. 8, the ground BS may receive a shortest distance $L_{min}$ (which may be included in the interference coordination information) that is between the HAPS and the ground BS and that is sent by the HAP S, calculate a shrunk coverage radius of the interfered-with secondary carrier F2 according to the shortest distance, and in the time period from the interference start time to the interference end time, shrink the coverage range of the interfered-with secondary carrier F2 in a central area of a coverage area of the ground BS into an area with a radius less than or equal to R=$L_{min}$-R2 (a radius of the central area of the coverage area of the ground BS).

Figure 10:
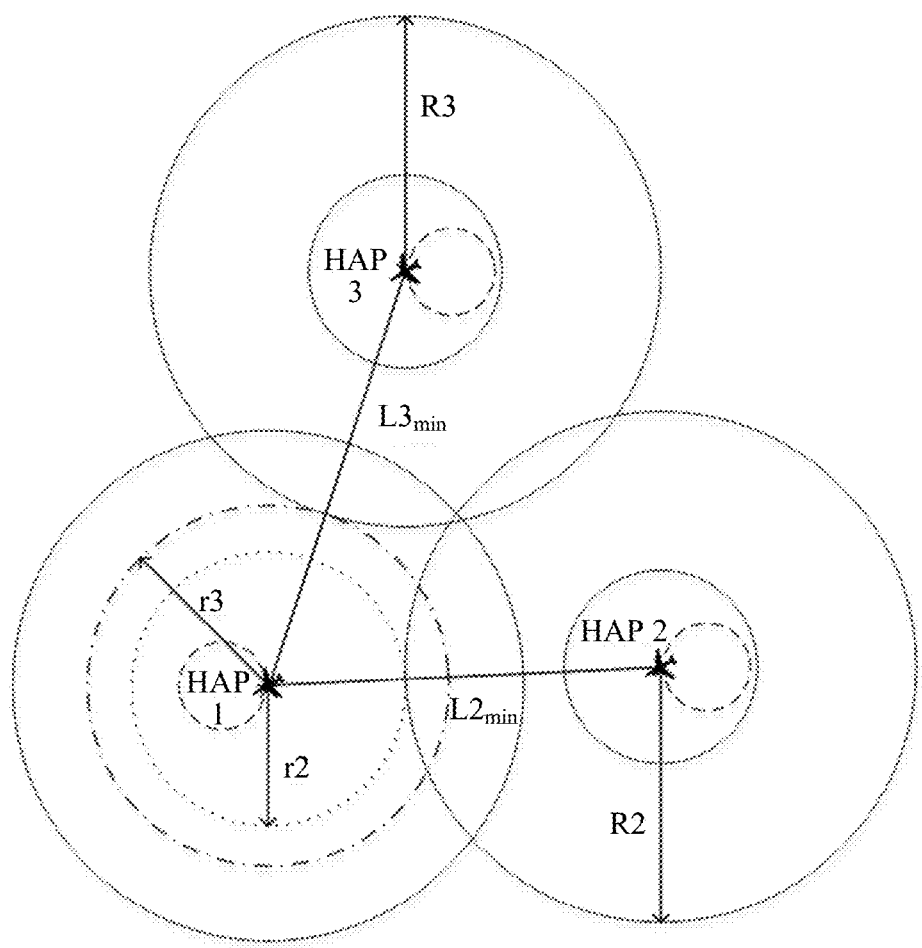
FIG. 10 is a schematic diagram of carriers of three adjacent HAPSs.

FIG. 10 shows a scenario of three adjacent HAPSs. A primary carrier F1 is used in an edge area of a coverage area of a HAPS 1, and secondary carriers F2 and F3 are used in a central area. The primary carrier F2 is used in an edge area of a coverage area of a HAPS 2, and the secondary carriers F1 and F3 are used in a central area. The primary carrier F3 is used in an edge area of a coverage area of a HAPS 3, and the secondary carriers F1 and F2 are used in a central area. F1, F2 and F3 are orthogonal to one another.

Figure 11:
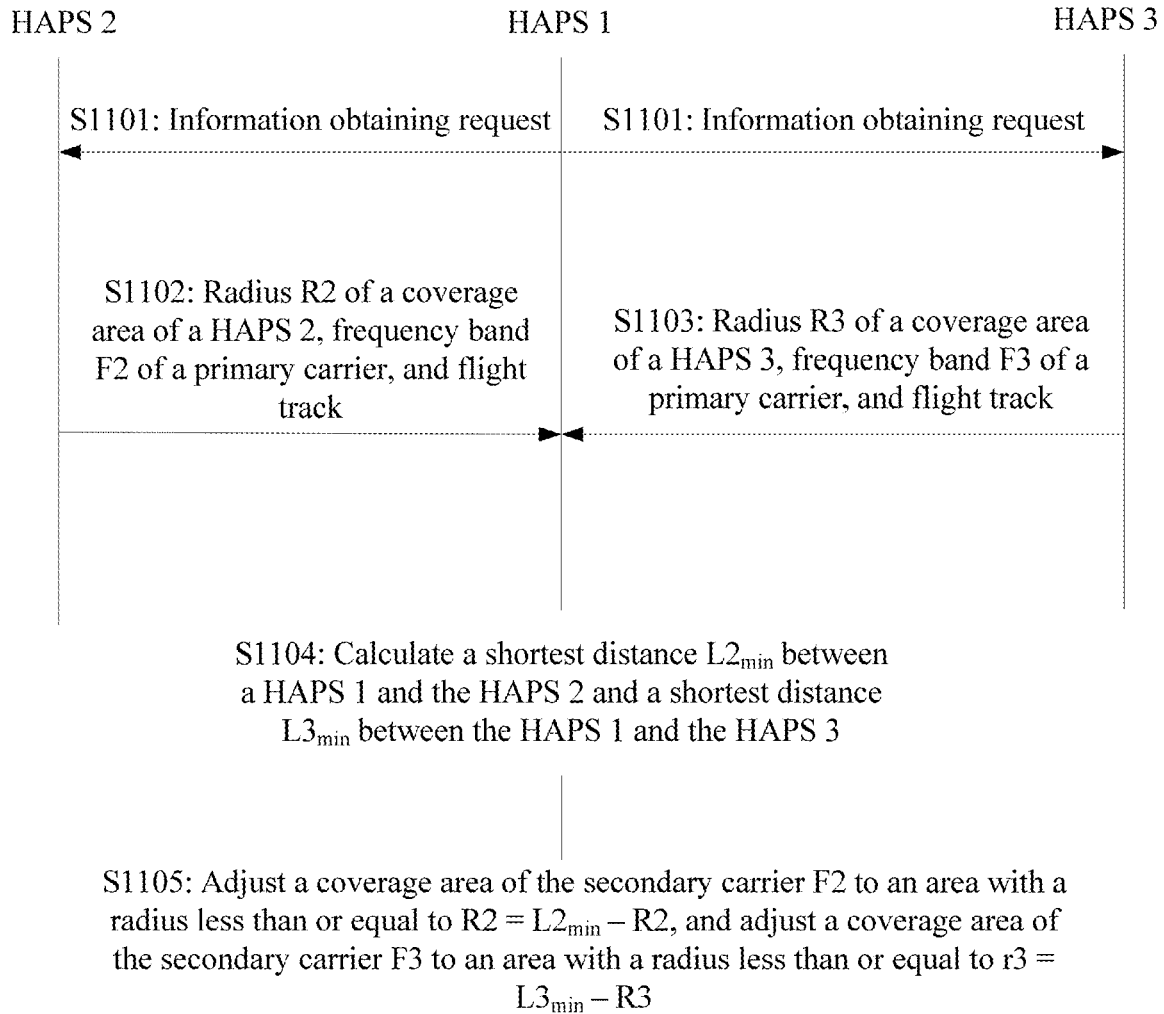
FIG. 11 is a flowchart of yet another interference coordination method disclosed in an embodiment of this application.

FIG. 11 shows a procedure of an interference coordination method applied to FIG. 10, and the procedure includes the following operations:

S1101: A HAPS 1 sends an information obtaining request to a HAPS 2 and a HAPS 3.

S1102: The HAPS 2 sends a radius R2 of a coverage area, a frequency band F2 of a primary carrier, and a flight track of the HAPS 2 to the HAPS 1.

S1103: The HAPS 3 sends a radius R3 of a coverage area, a frequency band F3 of a primary carrier, and a flight track of the HAPS 3 to the HAPS 1.

S1104: The HAPS 1 calculates a shortest distance $L2_{min}$ between the HAPS 1 and the HAPS 2 and a shortest distance $L3_{min}$ between the HAPS 1 and the HAPS 3.

S1105: The HAPS 1 adjusts a coverage area of the secondary carrier F2 to an area with a radius less than or equal to $r2=L2_{min}$-R2, and adjusts a coverage area of the secondary carrier F3 to an area with a radius less than or equal to $r_3=L3_{min}$-R3.

In comparison with the process shown in FIG. 9, in FIG. 11, a start time and an end time of interference do not need to be calculated, a time for shrinking a coverage range of a secondary carrier is not limited, and instead, the coverage range of the secondary carrier is directly adjusted to an interference-free range, so as to avoid frequent carrier adjustment.

Likewise, interference coordination information received by a ground BS from a HAPS may include only a shortest distance between the HAPS and the ground BS, without including an interference start time and an interference end time. The ground BS shrinks the coverage range of the interfered-with secondary carrier F2 into an area with a radius less than or equal to R=$L_{min}$-R2 (a radius of a central area of a coverage area of the ground BS).

Figure 12:
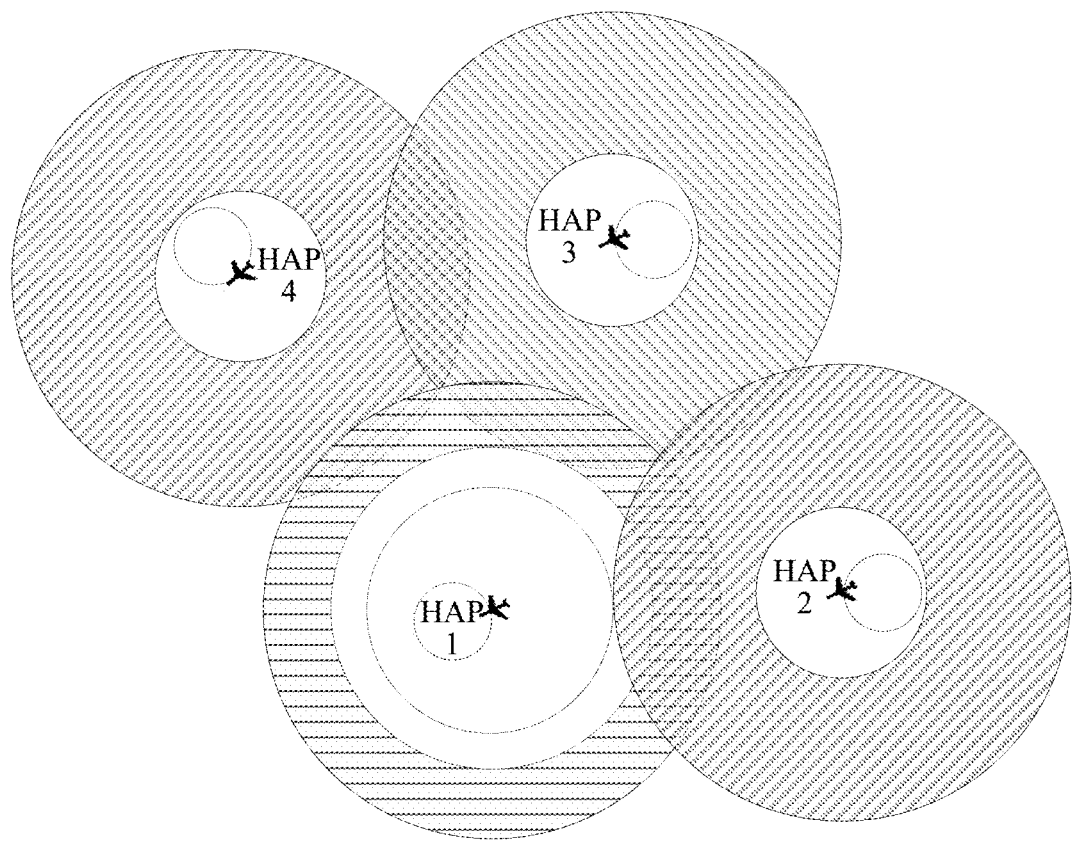
FIG. 12 is a schematic diagram of subcarriers with unbalanced load.
Figure 12:
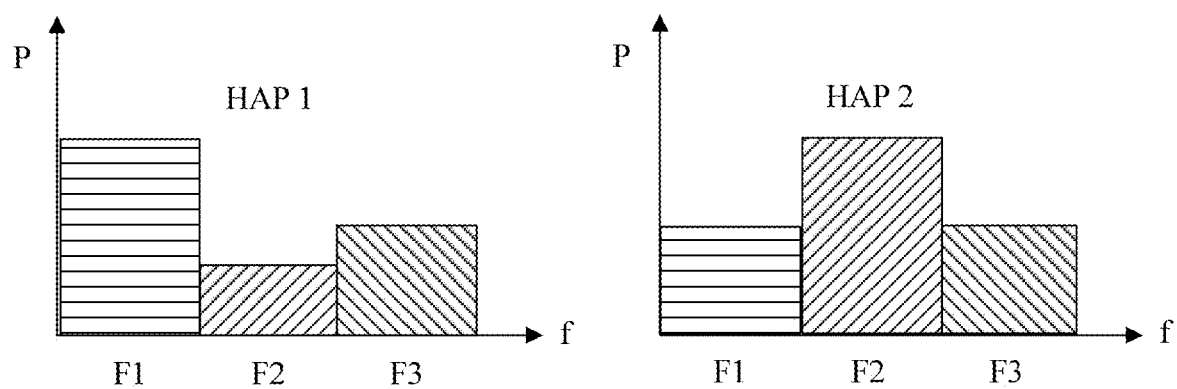

In a scenario of multi-carrier multiplexing, in practical application, a problem of subcarriers with unbalanced load may occur. For example, as shown in FIG. 12, coverage areas of a HAPS 1, a HAPS 2, and a HAPS 3 are adjacent to each other, and coverage areas of the HAPS 1, the HAPS 3, and a HAPS 4 are adjacent to each other. A primary carrier F1 is used in an edge area of the coverage area of the HAPS 1, and secondary carriers F2 and F3 are used in a central area. The primary carrier F2 is used in an edge area of the coverage area of the HAPS 2, and the secondary carriers F1 and F3 are used in a central area. The primary carrier F3 is used in an edge area of the coverage area of the HAPS 3, and the secondary carriers F1 and F2 are used in a central area. The primary carrier F2 is used in an edge area of the coverage area of the HAPS 4, and the secondary carriers F1 and F3 are used in a central area. There are a large quantity of users in the edge area of the coverage area of the HAPS 1 and a small quantity of users in the central area. As a result, there are a large quantity of users using the primary carrier F1 and a small quantity of users using the secondary carriers F2 and F3. Therefore, load on the primary carrier F1 is heavy, and load on the secondary carriers F2 and F3 is light. As a result, load is unbalanced.

In this case, the HAPS 1 expects to schedule a user on a primary carrier to a secondary carrier, that is, to expand a coverage area of the secondary carrier, so as to avoid a decrease in communication quality of an edge user. Before expanding the coverage range of the secondary carrier, the HAPS 1 needs to negotiate with an adjacent HAPS, so as to avoid mutual interference.

Figure 13:
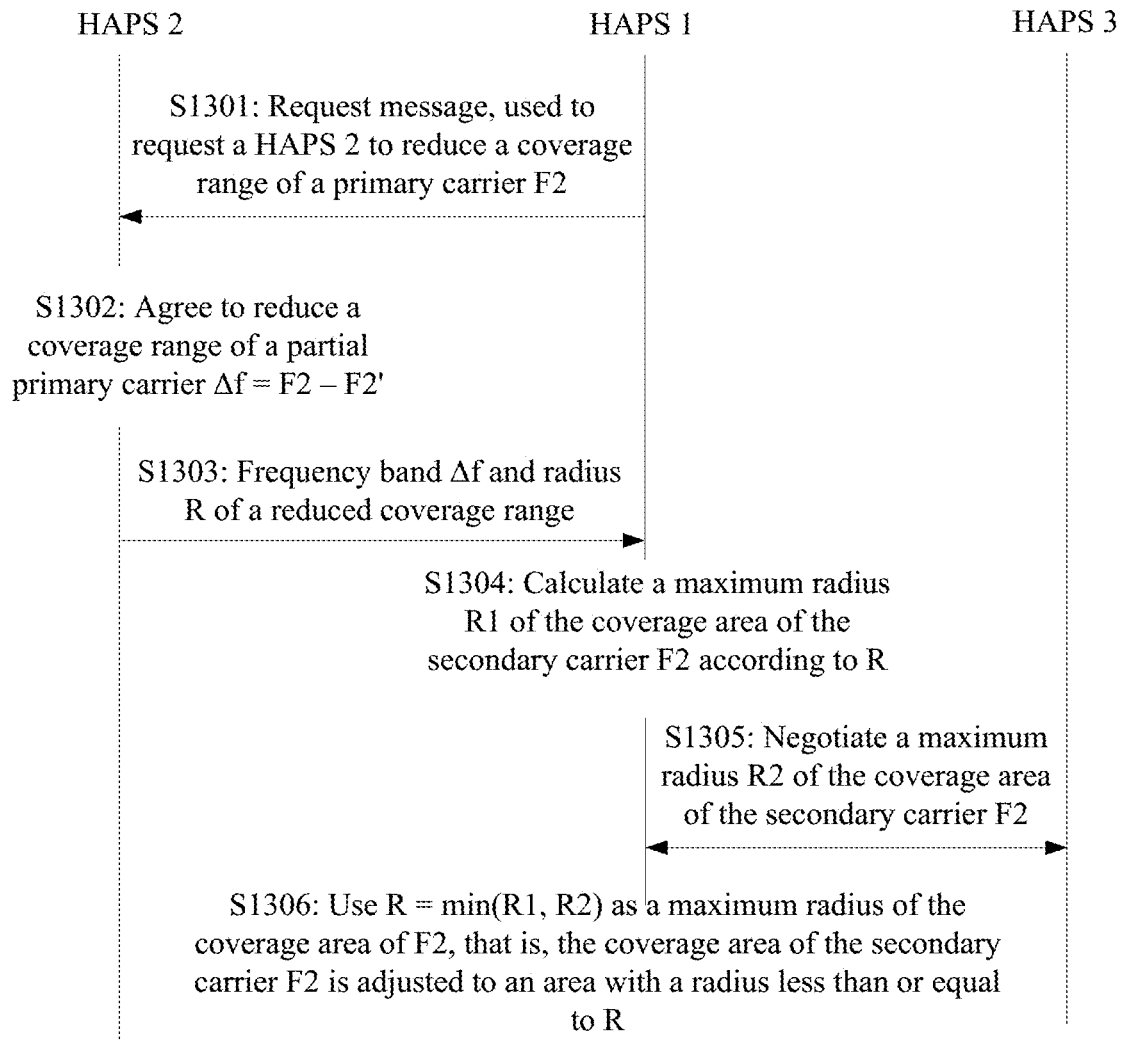
FIG. 13 is a schematic diagram of still yet another interference coordination method disclosed in an embodiment of this application.

For example, a HAPS 1 negotiates with a HAPS 2. FIG. 13 shows still yet another interference coordination method disclosed in an embodiment of this application, and the method includes the following operations.

After shrinking a coverage range of an interfered-with secondary carrier according to the process shown in FIG. 11, the HAPS 1 performs the following process:

S1301: The HAPS 1 sends a request message to the HAPS 2, where the request message is used to request the HAPS 2 to reduce a coverage range of a primary carrier F2.

S1302: The HAPS 2 agrees to reduce a coverage range of a partial frequency band of the primary carrier F2.

Specifically, the HAPS 2 dynamically adjusts, according to a load status of an edge area of a coverage area, a frequency band and a coverage range of a carrier used in the edge area. For a specific adjustment method, refer to an existing downlink dynamic ICIC algorithm in LTE. Details are not described herein.

Specifically, the HAPS 2 divides the primary carrier F2 into two parts: $\Delta f$ and F2', and agrees to reduce a coverage range of a partial primary carrier $\Delta f$ and to retain a coverage range of F2'. The HAPS 2 may reduce the coverage range of $\Delta f$ by reducing transmit power of the frequency band $\Delta f$.

S1303: The HAPS 2 sends frequency band information $\Delta f$ and a radius R of a reduced coverage range to the HAPS 1.

S1304: The HAPS 1 calculates a maximum radius R1 of a coverage area of a partial secondary carrier $\Delta f$ according to R. For a specific calculation method, refer to the process shown in FIG. 11.

It should be noted that the HAPS 1 has already calculated the coverage area of F2 according to FIG. 13, and therefore, after reducing the coverage range of $\Delta f$, the HAPS 2 needs to recalculate only the maximum radius R1 of the coverage area of $\Delta f$.

S1305: Similar to the foregoing process, the HAPS 1 further needs to negotiate with a HAPS 3, so as to obtain a maximum radius R2 that is of a coverage area of the partial secondary carrier $\Delta f$ and that is after the HAPS 1 negotiates with the HAPS 3.

S1306: The HAPS 1 uses R=min(R1, R2) as a maximum radius of the coverage area of the partial secondary carrier $\Delta f$, that is, the coverage area of the partial secondary carrier $\Delta f$ is adjusted to an area with a radius less than or equal to R.

Figure 14:
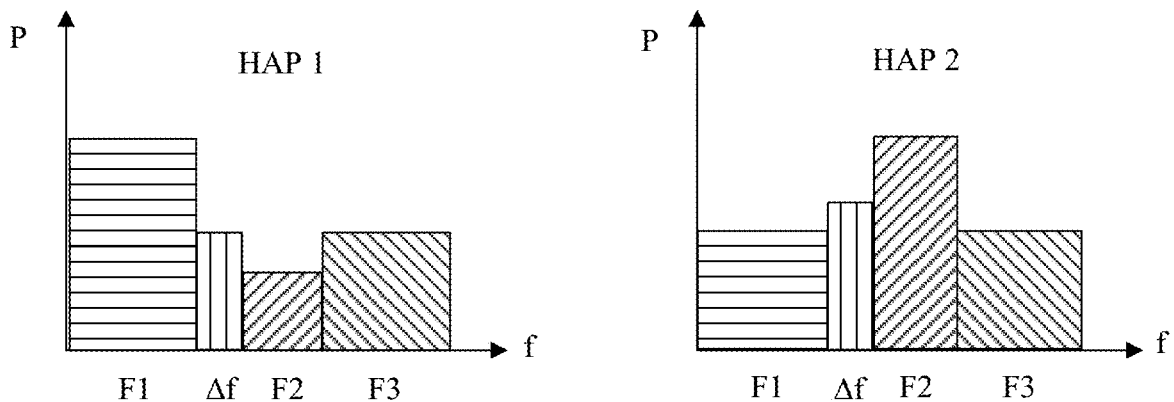
FIG. 14 is a schematic diagram of power allocation of carriers after a HAPS 1 negotiates with a HAPS 2.

FIG. 14 shows a power allocation status of each carrier after a HAPS 1 negotiates with a HAPS 2.

It should be noted that the process shown in FIG. 13 may be applied after the process shown in FIG. 9 or FIG. 11, that is, after a maximum radius is obtained in FIG. 9 or FIG. 11, the HAPS 1 may further negotiate with another HAPS to expand a coverage range of a secondary carrier, and determine a maximum radius of a new coverage area of the secondary carrier according to a negotiation result.

Different from FIG. 13, the HAPS 1 may alternatively negotiate with the HAPS 2 to reduce a coverage range of a primary carrier F2 of the HAPS 2 before the process shown in FIG. 11. After agreeing to reduce a coverage range of a partial frequency band of the primary carrier F2, the HAPS 2 may send $\Delta f$ in the primary carrier F2 and a coverage radius of $\Delta f$ as well as F2' and a coverage radius of F2' to the HAPS 1. The HAPS 1 separately calculates a maximum radius of a coverage area of $\Delta f$ and a maximum radius of a coverage area of F2', and finally determines a coverage area of an interfered-with secondary carrier.

In one embodiment, the HAPS 2 may alternatively agree to reduce a coverage range of an entire frequency band of the primary carrier, instead of dividing the primary carrier into $\Delta f$ and F2'.

Figure 15:
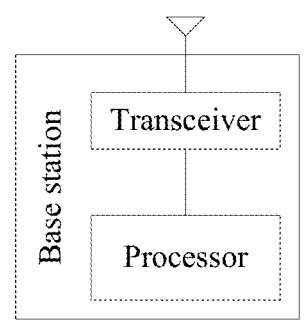
FIG. 15 is a schematic structural diagram of a base station disclosed in an embodiment of this application.

FIG. 15 is a schematic diagram of a base station disclosed in an embodiment of this application. The base station includes a transceiver and a processor.

The transceiver is configured to receive interference coordination information generated by a high altitude platform station, where the interference coordination information includes a frequency band of a carrier, an interference start time, and an interference end time. The interference start time is a time at which the high altitude platform station starts to interfere with the base station, the interference end time is a time at which the high altitude platform station stops interfering with the base station, and the carrier is used in both an edge area of a coverage area of the high altitude platform station and a central area of a coverage area of the base station. The processor is configured to adjust a coverage range of the carrier in the central area of the coverage area of the base station according to the interference coordination information, so that the base station is not interfered with by the carrier of the high altitude platform station.

For specific implementations in which the transceiver and the processor implement their respective functions, refer to the steps of the ground BS in the foregoing method embodiments, and details are not described herein again.

Figure 16:
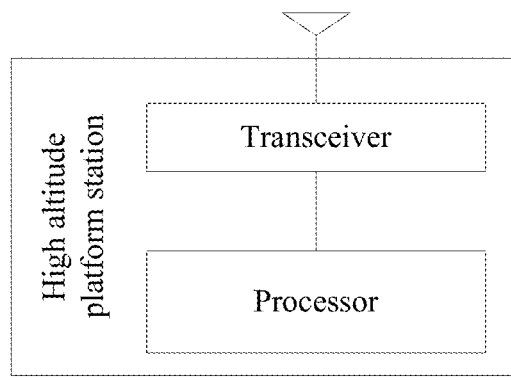
FIG. 16 is a schematic structural diagram of a high altitude platform station disclosed in an embodiment of this application.

FIG. 16 shows a high altitude platform station disclosed in an embodiment of this application. The high altitude platform station includes a transceiver and a processor.

The transceiver is configured to receive information, where the information includes a location of a ground base station and a radius of a central area of a coverage area of the ground base station. The processor is configured to calculate an interference start time and an interference end time according to the information, the radius, and a flight parameter of the high altitude platform station, where the interference start time is a time at which the high altitude platform station starts to interfere with the ground base station, and the interference end time is a time at which the high altitude platform station stops interfering with the ground base station. The transceiver is further configured to send interference coordination information to the ground base station, where the interference coordination information includes the interference start time, the interference end time, and a frequency band of a carrier, and the carrier is used in both an edge area of a coverage area of the high altitude platform station and the central area of the coverage area of the ground base station. The transceiver is further configured to send an information obtaining request to the ground base station before receiving location information of the ground base station and the radius of the central area of the coverage area of the ground base station, where the information obtaining request is used to obtain the information and the radius of the central area of the coverage area of the ground base station.

The base station and the high altitude platform station shown in FIG. 15 and FIG. 16 can implement an interaction process shown in FIG. 5, so as to avoid communication interference of the high altitude platform station to the base station.

An embodiment of this application further discloses another high altitude platform station, including a processor and a transceiver, so as to implement the functions shown in FIG. 9 and FIG. 11. Specifically, the transceiver is configured to implement the functions of sending and receiving of the first high altitude platform station shown in FIG. 9 and FIG. 11, and the processor is configured to implement the functions other than sending and receiving of the first high altitude platform station shown in FIG. 9 and FIG. 11.

For a specific structure of the high altitude platform station, refer to FIG. 16.

What is claimed is:

1. An interference coordination method, comprising:
receiving, by a high altitude platform station, information, wherein the information comprises a location of a ground base station and a radius of a central area of a coverage area of the ground base station, and wherein the central area of the coverage area of the ground base station is an area in which all carriers allocated to the ground base station can be used;
calculating, by the high altitude platform station, an interference start time and an interference end time according to the location, the radius, and a flight parameter of the high altitude platform station, wherein the interference start time is a time at which the high altitude platform station starts to interfere with the ground base station, wherein the interference end time is a time at which the high altitude platform station stops interfering with the ground base station, and wherein the high altitude platform station moves based on the flight parameter; and
sending, by the high altitude platform station, interference coordination information to the ground base station, wherein the interference coordination information comprises the interference start time, the interference end time, and a frequency band of a first carrier, wherein the first carrier is used in both an edge area of a coverage area of the high altitude platform station and the central area of the coverage area of the ground base station, wherein the interference coordination information is used by the ground base station to adjust a coverage range of the first carrier in the central area of the coverage area of the ground base station, so that the ground base station is not interfered with by the first carrier of the high altitude platform station, and wherein the edge area of the coverage area of the high altitude platform station is an area in which a subset of all carriers allocated to the high altitude platform station can be used.

2. The method according to claim 1, wherein the flight parameter of the high altitude platform station comprises one or more of
a flight track of the high altitude platform station or a flight speed of the high altitude platform station.

3. The method according to claim 1, further comprising:
sending, by the high altitude platform station, an information obtaining request to the ground base station, wherein the information obtaining request is used to request the information received by the high altitude platform station.

4. An interference coordination method, comprising:
receiving, by a ground base station, interference coordination information generated by a high altitude platform station, wherein the interference coordination information comprises a frequency band of a first carrier, an interference start time, and an interference end time, wherein the interference start time is a time at which the high altitude platform station starts to interfere with the ground base station, wherein the interference end time is a time at which the high altitude platform station stops interfering with the ground base station, wherein the first carrier is used in both an edge area of a coverage area of the high altitude platform station and a central area of a coverage area of the ground base station, wherein the edge area of the coverage area of the high altitude platform station is an area in which a subset of all carriers allocated to the high altitude platform station can be used, and wherein the central area of the coverage area of the ground base station is an area in which all carriers allocated to the ground base station can be used; and
adjusting, by the ground base station, a coverage range of the first carrier in the central area of the coverage area of the ground base station according to the interference coordination information, so that the ground base station is not interfered with by the first carrier of the high altitude platform station.

5. The method according to claim 4, wherein the adjusting a coverage range of the first carrier in the central area of the coverage area of the ground base station according to the interference coordination information comprises:
scheduling, by the ground base station, in a time period from the interference start time to the interference end time, a user who uses the first carrier in the central area of the coverage area of the ground base station to use a second carrier; and
disabling the first carrier, so that the coverage range of the first carrier in the central area of the coverage area of the ground base station is zero, and the second carrier is orthogonal to the first carrier.

6. An interference coordination method, comprising:
obtaining, by a first high altitude platform station, interference coordination information, wherein the interference coordination information comprises a frequency band of a first carrier and at least one of an interference start time, an interference end time, or a shortest distance between the first high altitude platform station and a second high altitude platform station, wherein the first carrier is used in both an edge area of a coverage area of the second high altitude platform station and a central area of a coverage area of the first high altitude platform station, wherein the interference start time is a time at which the second high altitude platform station starts to interfere with the first high altitude platform station, wherein the interference end time is a time at which the second high altitude platform station stops interfering with the first high altitude platform station, wherein the central area of the coverage area of the first high altitude platform station is an area in which all carriers allocated to the first high altitude platform station can be used, and wherein the edge area of the coverage area of the second high altitude platform station is an area in which a subset of all carriers allocated to the second high altitude platform station can be used; and
adjusting, by the first high altitude platform station, a coverage range of the first carrier in the central area of the coverage area of the first high altitude platform station according to the interference coordination information, so that the first high altitude platform station is not interfered with by the first carrier of the second high altitude platform station.

7. The method according to claim 6, wherein the interference coordination information comprises the frequency band of the first carrier, the interference start time, and the interference end time, and wherein the adjusting, by the first high altitude platform station, a coverage range of the first carrier in the central area of the coverage area of the first high altitude platform station according to the interference coordination information comprises:
scheduling, by the first high altitude platform station in a time period from the interference start time to the interference end time, a user who uses the first carrier in the central area of the coverage area of the first high altitude platform station to use a second carrier; and
disabling, by the first high altitude platform station, the first carrier, so that the coverage range of the first carrier in the central area of the coverage area of the first high altitude platform station is zero, wherein the second carrier is orthogonal to the first carrier.

8. The method according to claim 6, wherein the interference coordination information comprises the frequency band of the first carrier, the interference start time, the interference end time, and the shortest distance between the first high altitude platform station and the second high altitude platform station, and wherein
the adjusting, by the first high altitude platform station, a coverage range of the first carrier in the central area of the coverage area of the first high altitude platform station according to the interference coordination information comprises:
scheduling, by the first high altitude platform station in a time period from the interference start time to the interference end time, some users who use the first carrier in the central area of the coverage area of the first high altitude platform station to use a second carrier; and
shrinking, by the first high altitude platform station, the coverage range of the first carrier in the central area of the coverage area of the first high altitude platform station into a target area, wherein a radius of the target area is less than or equal to a target radius, wherein the target radius is a difference between the shortest distance and a radius of the coverage area of the second high altitude platform station, wherein the some users are users who are covered before the coverage range of the first carrier is shrunk but are not covered after the coverage range of the first carrier is shrunk, and wherein the second carrier is orthogonal to the first carrier.

9. The method according to claim 6, wherein the interference coordination information comprises the frequency band of the first carrier and the shortest distance between the first high altitude platform station and the second high altitude platform station, and wherein
the adjusting, by the first high altitude platform station, a coverage range of the first carrier in the central area of the coverage area of the first high altitude platform station according to the interference coordination information comprises:
scheduling, by the first high altitude platform station, some users who use the first carrier in the central area of the coverage area of the first high altitude platform station to use a second carrier; and
shrinking, by the first high altitude platform station, the coverage range of the first carrier in the central area of the coverage area of the first high altitude platform station into a target area, wherein a radius of the target area is less than or equal to a target radius, wherein the target radius is a difference between the shortest distance and a coverage radius of the second high altitude platform station, wherein the some users are users who are covered before the coverage range of the first carrier is shrunk but are not covered after the coverage range of the first carrier is shrunk, and wherein the second carrier is orthogonal to the first carrier.

10. The method according to claim 6, wherein the obtaining, by a first high altitude platform station, interference coordination information comprises:
sending, by the first high altitude platform station, an information obtaining request to the second high altitude platform station;
receiving, by the first high altitude platform station, information that is sent by the second high altitude platform station according to the information obtaining request, wherein the information comprises the frequency band of the first carrier, a flight parameter of the second high altitude platform station, and a radius of the coverage area of the second high altitude platform station, wherein the second high altitude platform station moves based on the flight parameter of the second high altitude platform station; and
calculating, by the first high altitude platform station, the interference coordination information according to a flight parameter of the first high altitude platform station, the flight parameter of the second high altitude platform station, and the radius of the coverage area of the second high altitude platform station, wherein the first high altitude platform station moves based on the flight parameter of the first high altitude platform station.

11. The method according to claim 10, wherein the flight parameter of the first high altitude platform station or the second high altitude platform station comprises one or more of
a flight track or a flight speed of the first high altitude platform station or the second high altitude platform station, respectively.

12. The method according to claim 10, wherein before the obtaining, by the first high altitude platform station, the interference coordination information, the method further comprises:
sending, by the first high altitude platform station, a request message for reducing the coverage range of the first carrier to the second high altitude platform station, wherein
the frequency band of the first carrier comprises:
a partial frequency band $\Delta f$ in the first carrier and another frequency band different from the $\Delta f$ in the first carrier, wherein the $\Delta f$ is a frequency band whose coverage range the second high altitude platform station agrees to reduce in the first carrier, and the another frequency band different from the $\Delta f$ is a frequency band whose original coverage range in the first carrier remains unchanged, and wherein the information further comprises:
a coverage radius of the $\Delta f$ and a coverage radius of the another frequency band different from the $\gamma f$ in the carrier.

13. The method according to claim 10, wherein after the adjusting, by the first high altitude platform station, the coverage range of the first carrier in the central area of the coverage area of the first high altitude platform station according to the interference coordination information, the method further comprises:
sending, by the first high altitude platform station, a request message for reducing the coverage range of the first carrier to the second high altitude platform station;

receiving, by the first high altitude platform station, a partial frequency band $\Delta f$ in the first carrier and a coverage radius of the $\Delta f$ that are sent by the second high altitude platform station according to the request message; and readjusting, by the first high altitude platform station, a coverage range of the $\Delta f$ in the central area of the coverage area of the first high altitude platform station according to the $\Delta f$ and the coverage radius of the $\Delta f$.

14. A high altitude platform station, comprising:
a transceiver configured to receive information, wherein the information comprises a location of a ground base station and a radius of a central area of a coverage area of the ground base station, and wherein the central area of the coverage area of the ground base station is an area in which all carriers allocated to the ground base station can be used; and
a processor configured to calculate an interference start time and an interference end time according to the location, the radius, and a flight parameter of the high altitude platform station, wherein the interference start time is a time at which the high altitude platform station starts to interfere with the ground base station, wherein the interference end time is a time at which the high altitude platform station stops interfering with the ground base station, and wherein the high altitude platform station moves based on the flight parameter, wherein
the transceiver is further configured to send interference coordination information to the ground base station, wherein the interference coordination information comprises the interference start time, the interference end time, and a frequency band of a first carrier, wherein the first carrier is used in both an edge area of a coverage area of the high altitude platform station and the central area of the coverage area of the ground base station, wherein the interference coordination information is used by the ground base station to adjust a coverage range of the first carrier in the central area of the coverage area of the ground base station, so that the ground base station is not interfered with by the first carrier of the high altitude platform station, and wherein the edge area of the coverage area of the high altitude platform station is an area in which a subset of all carriers allocated to the high altitude platform station can be used.

15. The high altitude platform station according to claim 14, wherein the processor being configured to calculate the interference start time and the interference end time according to the location, the radius, and the flight parameter of the high altitude platform station comprises:
the processor is configured to calculate the interference start time and the interference end time according to the location, the radius, and one or more of a flight track of the high altitude platform station or a flight speed of the high altitude platform station.

16. The high altitude platform station according to claim 14, wherein the transceiver is further configured to:
send an information obtaining request to the ground base station, wherein the information obtaining request is used to request the information received by the high altitude platform station.

17. A base station, comprising:
a transceiver configured to receive interference coordination information generated by a high altitude platform station, wherein the interference coordination information comprises a frequency band of a first carrier, an interference start time, and an interference end time, wherein the interference start time is a time at which the high altitude platform station starts to interfere with the base station, wherein the interference end time is a time at which the high altitude platform station stops interfering with the base station, wherein the first carrier is used in both an edge area of a coverage area of the high altitude platform station and a central area of a coverage area of the base station, wherein the edge area of the coverage area of the high altitude platform station is an area in which a subset of all carriers allocated to the high altitude platform station can be used, and the central area of the coverage area of the base station is an area in which all carriers allocated to the base station can be used; and
a processor configured to adjust a coverage range of the first carrier in the central area of the coverage area of the base station according to the interference coordination information, so that the base station is not interfered with by the first carrier of the high altitude platform station.

18. The base station according to claim 17, wherein the processor being configured to adjust the coverage range of the first carrier in the central area of the coverage area of the base station according to the interference coordination information comprises:
the processor is configured to:
schedule, in a time period from the interference start time to the interference end time, a user who uses the first carrier in the central area of the coverage area of the base station to use a second carrier; and
disable the first carrier, so that the coverage range of the first carrier in the central area of the coverage area of the base station is zero, and the second carrier is orthogonal to the first carrier.

19. A high altitude platform station, comprising:
a processor configured to:
obtain interference coordination information, wherein the interference coordination information comprises a frequency band of a first carrier and at least one of an interference start time, an interference end time, or a shortest distance between the high altitude platform station and another high altitude platform station, wherein the first carrier is used in both a central area of a coverage area of the high altitude platform station and an edge area of a coverage area of the another high altitude platform station, wherein the interference start time is a time at which the another high altitude platform station starts to interfere with the high altitude platform station, and wherein the interference end time is a time at which the another high altitude platform station stops interfering with the high altitude platform station; and
adjust a coverage range of the first carrier in the central area of the coverage area of the high altitude platform station according to the interference coordination information, so that the central area of the coverage area of the high altitude platform station is not interfered with by the first carrier of the another high altitude platform station, wherein the central area of the coverage area of the high altitude platform station is an area in which all carriers allocated to the high altitude platform station can be used, and wherein the edge area of the coverage area of the another high altitude platform station is an area in which a subset of all carriers allocated to the another high altitude platform station can be used.

20. The high altitude platform station according to claim 19, wherein the processor being configured to obtain the interference coordination information comprises:
the processor is configured to obtain the frequency band of the first carrier, the interference start time, and the interference end time, and
wherein processor being configured to adjust the coverage range of the first carrier in the central area of the coverage area of the high altitude platform station according to the interference coordination information comprises the processor is configured to:
schedule, in a time period from the interference start time to the interference end time, a user who uses the first carrier in the central area of the coverage area of the high altitude platform station to use a second carrier; and
disable the first carrier, so that the coverage range of the first carrier in the central area of the coverage area of the high altitude platform station is zero, and the second carrier is orthogonal to the carrier.

21. The high altitude platform station according to claim 19, wherein the processor being configured to obtain the interference coordination information comprises:
the processor is configured to obtain the frequency band of the first carrier, the interference start time, the interference end time, and the shortest distance between the high altitude platform station and the another high altitude platform station, and
wherein the processor being configured to adjust the coverage range of the first carrier in the central area of the coverage area of the high altitude platform station according to the interference coordination information comprises the processor is configured to:
schedule, in a time period from the interference start time to the interference end time, some users who use the first carrier in the central area of the coverage area of the high altitude platform station to use a second carrier; and
shrink the coverage range of the first carrier in the central area of the coverage area of the high altitude platform station into a target area, wherein a radius of the target area is less than or equal to a target radius, wherein the target radius is a difference between the shortest distance and a coverage radius of the another high altitude platform station, wherein the some users are users who are covered before the coverage range of the first carrier is shrunk but are not covered after the coverage range of the first carrier is shrunk, and wherein the second carrier is orthogonal to the first carrier.

22. The high altitude platform station according to claim 19, wherein the processor being configured to obtain the interference coordination information comprises:
the processor is configured to obtain the frequency band of the first carrier and the shortest distance between the high altitude platform station and the another high altitude platform station, and
wherein the processor being configured to adjust the coverage range of the first carrier in the central area of the coverage area of the high altitude platform station according to the interference coordination information comprises the processor is configured to:
schedule some users who use the first carrier in the central area of the coverage area of the high altitude platform station to use a second carrier; and
shrink the coverage range of the first carrier in the central area of the coverage area of the high altitude platform station into a target area, wherein a radius of the target area is less than or equal to a target radius, wherein the target radius is a difference between the shortest distance and a coverage radius of the another high altitude platform station, wherein the some users are users who are covered before the coverage range of the first carrier is shrunk but are not covered after the coverage range of the first carrier is shrunk, and wherein the second carrier is orthogonal to the first carrier.

23. The high altitude platform station according to claim 19, further comprising:
a transceiver configured to:
send an information obtaining request to the another high altitude platform station; and
receive information that is sent by the another high altitude platform station according to the information obtaining request, wherein the information comprises the frequency band of the first carrier, a flight parameter of the another high altitude platform station, and a radius of the coverage area of the another high altitude platform station, and wherein the another high altitude platform station moves based on the flight parameter of the another high altitude platform station, wherein
the processor being configured to obtain the interference coordination information comprises:
the processor is configured to calculate the interference coordination information according to a flight parameter of the high altitude platform station, the flight parameter of the another high altitude platform station, and the radius of the coverage area of the another high altitude platform station, wherein the high altitude platform station moves based on the flight parameter of the high altitude platform station.

24. The high altitude platform station according to claim 23, wherein the flight parameter of the another high altitude platform station comprises one or more of:
a flight track or a flight speed of the another high altitude platform station.

25. The high altitude platform station according to claim 23, wherein the transceiver is further configured to:
send a request message for reducing the coverage range of the first carrier to the another high altitude platform station before the processor is configured to obtain the interference coordination information;
wherein the transceiver being configured to receive the frequency band of the first carrier that is sent by the another high altitude platform station according to the information obtaining request comprises the transceiver is configured to:
receive a partial frequency band $\Delta f$ in the first carrier and another frequency band different from the $\Delta f$ in the first carrier that are sent by the another high altitude platform station according to the information obtaining request, wherein the $\Delta f$ is a frequency band whose coverage range the another high altitude platform station agrees to reduce in the first carrier, and the another frequency band different from the $\Delta f$ is a frequency band whose original coverage range in the first carrier remains unchanged; and
receive a coverage radius of the $\Delta f$ and a coverage radius of the another frequency band different from the $\Delta f$ in the carrier that are sent by the another high altitude platform station.

26. The high altitude platform station according to claim 23, wherein the transceiver is further configured to:
send a request message for reducing the coverage range of the first carrier to the another high altitude platform station after the processor is configured to adjust the coverage range of the carrier in the central area of the coverage area of the high altitude platform station according to the interference coordination information; and receive a partial frequency band $\Delta f$ in the first carrier and a coverage radius of the $\Delta f$ that are sent by the another high altitude platform station according to the request message; and wherein the processor is further configured to readjust a coverage range of the $\Delta f$ in the central area of the coverage area of the high altitude platform station according to the $\Delta f$ and the coverage radius of the $\Delta f$.

* * * * *

UNITED STATES PATENT AND TRADEMARK OFFICE
CERTIFICATE OF CORRECTION

PATENT NO. : 10,985,849 B2
APPLICATION NO. : 16/457575
DATED : April 20, 2021
INVENTOR(S) : Kaiyao Wang and Yongjun Liu Page 1 of 1

It is certified that error appears in the above-identified patent and that said Letters Patent is hereby corrected as shown below:

In the Claims

In Claim 12, Column 20, Line 57, "yf" should be --$\Delta f$--.

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*